(12) United States Patent
Pasricha et al.

(10) Patent No.: US 11,751,057 B2
(45) Date of Patent: Sep. 5, 2023

(54) SECURITY-ENHANCED DEEP LEARNING FINGERPRINT-BASED INDOOR LOCALIZATION

(71) Applicant: COLORADO STATE UNIVERSITY RESEARCH FOUNDATION, Fort Collins, CO (US)

(72) Inventors: Sudeep Pasricha, Fort Collins, CO (US); Saideep Tiku, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 442 days.

(21) Appl. No.: 17/026,123

(22) Filed: Sep. 18, 2020

(65) Prior Publication Data

US 2021/0092611 A1 Mar. 25, 2021

Related U.S. Application Data

(60) Provisional application No. 62/902,779, filed on Sep. 19, 2019.

(51) Int. Cl.
| | |
|---|---|
| *H04W 12/12* | (2021.01) |
| *H04W 4/33* | (2018.01) |
| *H04W 4/021* | (2018.01) |
| *H04B 17/318* | (2015.01) |
| *G06N 3/08* | (2023.01) |
| *G06N 3/04* | (2023.01) |
| *G01S 5/02* | (2010.01) |
| *H04W 12/122* | (2021.01) |

(52) U.S. Cl.
CPC ......... *H04W 12/122* (2021.01); *G01S 5/0252* (2013.01); *G06N 3/04* (2013.01); *G06N 3/08* (2013.01); *H04B 17/318* (2015.01); *H04W 4/021* (2013.01); *H04W 4/33* (2018.02)

(58) Field of Classification Search
CPC ..... H04W 12/122; H04W 4/021; H04W 4/33; H04W 12/12; G01S 5/0252; G01S 5/0215; G01S 5/02524; G01S 5/02; G06N 3/04; G06N 3/08; G06N 7/01; G06N 3/045; H04B 17/318; G06F 21/54; Y04S 40/20; H04K 3/43; H04K 3/65; H04K 3/22
See application file for complete search history.

(56) References Cited

U.S. PATENT DOCUMENTS

| | | | | |
|---|---|---|---|---|
| 10,716,089 | B1 * | 7/2020 | Huberman | H04W 64/006 |
| 11,032,022 | B1 * | 6/2021 | Sen | H04W 12/122 |
| 2018/0308013 | A1 * | 10/2018 | O'Shea | G06N 20/00 |

OTHER PUBLICATIONS

Laskow, "The Plane Crash That Gave Americans GPS", the Atlantic (2019).

(Continued)

*Primary Examiner* — Quazi Farooqui
(74) *Attorney, Agent, or Firm* — Meunier Carlin & Curfman LLC

(57) ABSTRACT

An exemplary radio fingerprint-based indoor localization method and system is disclosed that is resistant to spoofing or jamming attacks (e.g., at nearby radios, e.g., access points), among other types of interference. The exemplary method and system may be applied in the configuring of a secured convolutional neural network (S-CNNLOC) or secured deep neural network configured for attack-resistant fingerprint-based indoor localization.

17 Claims, 18 Drawing Sheets

(56) References Cited

OTHER PUBLICATIONS

Sullivan, "A brief history of GPS", PCWorld, Published Aug. 9, 2012. (Accessed 2019). Available on-line at https://www.pcworld.com/article/2000276/a-brief-history-of-gps.html.
Brewster, "This GPS Spoofing Hack Can Really Mess with Your Google Maps Trips", Forbes (2019).
Jones, "Spoofing in the Black Sea: What really happened?", GPS World, Published Oct. 11, 2017. (Accessed 2019). Available on-line at: https://www.gpsworld.com/spoofing-in-the-black-sea-what-really-happened/.
"Wi-Fi RTT (IEEE 802.11mc)", 2019 [online]. Available: https://www.source.android.com/devices/tech/connect/wifi-rtt.
Anonymous, "Top 33 indoor localization services in the US", TechNavio (Blog), Published Jun. 19, 2014. (Accessed 2019).
Y. Chen, W. Sun, and J. Juang, "Outlier detection technique for RSS-based localization problems in wireless sensor networks" SICE, 2010.
A. Khalajmehrabadi, N. Gatsis, D. J. Pack and D. Akopian, "A Joint Indoor WLAN Localization and Outlier Detection Scheme Using LAS-SO and Elastic-Net Optimization Techniques," in IEEE Transactions on Mobile Computing, vol. 16, No. 8, pp. 2079-2092, 2017.
J. Schmitz, M. Hernández and R. Mathar, "Real-time in-door localization with TDOA and distributed software de-fined radio: demonstration abstract," Information Processing in Sensor Networks (IPSN), 2016.
D. Vasisht, S. Kumar, and D. Katabi, "Sub-Nanosecond Time of Flight on Commercial Wi-Fi Cards," Special Interest Group on Data Communication (SIGCOMM), 2015.
Z. Chen, Z. Li, X. Zhang, G. Zhu, Y. Xu, J. Xiong and X. Wang, "AWL: Turning Spatial Aliasing From Foe to Friend for Accurate WiFi Localization," Conference on emerging Networking Experiments and Technologies (CoNEXT), 2017.
Z. Lu, W. Wang and C. Wang, "Modeling, Evaluation and Detection of Jamming Attacks in Time-Critical Wireless Applications," in IEEE Transactions on Mobile Computing, vol. 13, No. 8, pp. 1746-1759, 2014.
E. Soltanaghaei, A. Kalyanaraman and K. Whitehouse, "Multipath Tri-angulation: Decimeter-level Wi-Fi Localization and Orientation with a Single Unaided Receiver," Mobile Systems, Applications, and Services (MobiSys), 2018.
S. Pasricha, V. Ugave, C. W. Anderson and Q. Han, "LearnLoc: A framework for smart indoor localization with embedded mobile devices," Hardware/Software Codesign and System Synthesis (CODES+ISSS), 2015.
A. Mittal, S. Tiku, and S. Pasricha, "Adapting Convolutional Neural Networks for Indoor Localization with Smart Mobile Devices," Great Lakes Symposium on VLSI (GLSVLSI), 2018.
W. Meng, W. Xiao, W. Ni and L. Xie, "Secure and robust Wi-Fi finger-printing indoor localization," Indoor Positioning and Indoor Navigation (IPIN), 2011.
W. Zhang et al., "Deep Neural Networks for wireless localization in indoor and outdoor environments," Neurocomputing, vol. 194, pp. 279-287, 2016.
Y. K. Cheng, H. J. Chou and R. Y. Chang, "Machine-Learning Indoor Localization with Access Point Selection and Signal Strength Reconstruction", Vehicular Technology Conference (VTC), 2016.
P. Bahl, and V. Padmanabhan, "RADAR: An in-building RF-based user location and tracking system," INFOCOM, 2000.
"Ubisense Research Network", 2017 [Online] Available: http://www.ubisense.net/.
P. Dickinson, G. Cielniak, O. Szymanezyk and M. Mannion, "Indoor positioning of shoppers using a network of Bluetooth Low Energy beacons," Indoor Positioning and Indoor Navigation (IPIN), 2016.
S. Lau, T. Lin, T. Huang, I. Ng, and P. Huang, "A measurement study of zigbeebased indoor localization systems under RF interference," Workshop on Experimental evaluation and Characterization (WIN-TECH), 2009.
H. Zou, et al., "A Robust Indoor Positioning System Based on the Procrustes Analysis and Weighted Extreme Learning Machine," in IEEE Transactions on Wireless Computing, vol. 15, No. 2, pp. 1252-1266, 2016.
L. Chang, X. Chen, J. Wang, D. Fang, C. Liu, Z. Tang, and W. Nie, "TaLc: Time Adaptive Indoor Localization with Little Cost", MobiCom Workshop on Challenged Networks (CHANTS), 2015.
D. Barbará, R. Goel, and S. Jajodia, "Using checksums to detect data corruption," International Conference on Extending Database Technology, 2000.
L. Ou, Z. Qin, Y. Liu, H. Yin, Y. Hu and H. Chen, "Multi-User Location Correlation Protection with Differential Privacy," International Conference on Parallel and Distributed Systems (ICPADS), 2016.
C. Wu, Z. Yang and Y. Liu, "Smartphones Based Crowdsourcing for Indoor Localization," in IEEE Transactions on Mobile Computing, vol. 14, No. 2, pp. 444-457, 2015.
L. Lazos, et al., "Selective Jamming/Dropping Insider Attacks in Wireless Mesh Networks", IEEE Network, 30-34, 2011.
W. Xu, W. Trappe, Y. Zhang, and T. Wood, "The feasibility of launch-ing and detecting jamming attacks in wireless networks," Mobile ad hoc networking and computing (MobiHoc), 2005.
C. Wang, L. Zhu, L. Gong, et al., "Accurate Sybil Attack Detection Based on Fine-Grained Physical Channel Information," Sensors, vol. 18(3), No. 878, 2018.
A. A. A. Silva et al., "Predicting model for identifying the malicious activity of nodes in MANETs," Symposium on Computers and Communication (ISCC), 2015.
Y. LeCun et al., "Gradient-based learning applied to document recognition," Proceedings of the IEEE, vol. 86, No. 11, pp. 2278-2324, 1998.
J. S. Lee. "Digital image smoothing and the sigma filter," Computer Vision, Graphics, and Image Processing, vol. 24, No. 2, pp. 255-269, 1983.
X. Wang et al., "DeepFi: Deep learning for indoor fingerprinting using channel state information," Wireless Communications and Networking Conference (WCNC), 2015.
J. Machaj, P. Brida and R. Piché, "Rank based fingerprinting algorithm for indoor positioning," Indoor Positioning and Indoor Navigation (IPIN), 2011.
Y. Shu et al., "Gradient-Based Fingerprinting for Indoor Localization and Tracking," in IEEE Transactions on Industrial Electronics, vol. 63, No. 4, pp. 2424-2433, 2016.
F. Zhang, N. Cai, J. Wu, G. Cen, H. Wang and X. Chen, "Image de-noising method based on a deep convolution neural network," in IET Image Processing, vol. 12, No. 4, pp. 485-493, 2018.
HTC U11, [Online]: https://www.htc.com/us/smartphones/htc-u11.
MAC Address Clone on my TP-Link, [Online]: https://www.tplink.com/us/support/faq/68/.
M. Mohammadi, A. Al-Fuqaha, M. Guizani and J. Oh, "Semisupervised Deep Reinforcement Learning in Support of IoT and Smart City Ser-vices," Internet of Things Journal, vol. 5, No. 2, pp. 624-635, Apr. 2018.
J. A. Larcom and H. Liu, "Modeling and characterization of GPS spoof-ing," Conference on Technologies for Homeland Security (HST), 2013.
C. Bonebrake and L. Ross O'Neil, "Attacks on GPS Time Reliability," in IEEE Security & Privacy, vol. 12, No. 3, pp. 82-84, May 2014.
K. Jansen, M. Schäfer, D. Moser, V. Lenders, C. Pöpper and J. Schmitt, "Crowd-GPS-Sec: Leveraging Crowdsourcing to Detect and Localize GPS Spoofing Attacks," Symposium on Security and Privacy (SP), 2018.
K. Corina., and A. MacWilliams. "Overview of indoor positioning technologies for context aware AAL applications" Ambient Assisted Living, 2011.
V. Spasova, and I. Iliev. "A survey on automatic fall detection in the context of ambient assisted living systems" International journal of advanced computer research vol. 4.1, pp. 94, 2014.
Á.M. Guerrero-Higueras, N. DeCastro-García, F.J. Rodríguez-Lera, and V. Matellán, "Empirical analysis of cyber-attacks to an indoor real time localization system for autonomous robots," Computers & Security, vol. 70, pp. 422-435, 2017.

(56) References Cited

OTHER PUBLICATIONS

Á.M. Guerrero-Higueras, N. Matellan, "Detection of Cyber-attacks to indoor real time localization systems for autonomous robots," Robotics and Autonomous Systems, vol. 99, pp. 75-83, 2018.

* cited by examiner mWAP0 mWAP2 mWAP4 mWAP6 mWAP8 mWAP10

"Office"

"Glover"

SECURITY-ENHANCED DEEP LEARNING FINGERPRINT-BASED INDOOR LOCALIZATION

RELATED APPLICATION

The application claims priority to, and the benefit of, U.S. Provisional Application No. 62/902,779, entitled "Overcoming Security Vulnerabilities in Deep Learning Based Indoor Localization Frameworks on Mobile Devices," filed Sep. 19, 2020, which is incorporated by reference herein in its entirety.

GOVERNMENT SUPPORT CLAUSE

This invention was made with government support under grant ECCS1646562 awarded by the National Science Foundation. The US government has certain rights in the invention.

FIELD OF THE INVENTION

The present disclosure relates to mobile device tracking or navigation, in particular, tracking or navigation using fingerprint-based indoor localization based on machine learning. The present disclosure also relates to the modeling of vulnerabilities of fingerprint-based indoor localization, which may be used in the configured of neural networks for fingerprint-based indoor localization.

BACKGROUND

Radio fingerprint-based indoor localization is an emerging application domain for the navigation and tracking of people and assets. Ubiquitously-available Wi-Fi signals have facilitated low-cost fingerprinting-based localization applications. Further, the rapid growth in mobile hardware capability allows high-accuracy deep learning-based frameworks to be executed locally on mobile devices in an energy-efficient manner.

Nevertheless, there is a benefit to making deep learning-based indoor localization applications more secure.

SUMMARY

An exemplary radio fingerprint-based indoor localization method and system is disclosed that is resistant to spoofing or jamming attacks (e.g., at nearby radios, e.g., access points), among other types of interference. The exemplary method and system may be applied in the configuring of a secured convolutional neural network (S-CNNLOC) configured for attack-resistant fingerprint-based indoor localization. In a study, an exemplary S-CNNLOC system was validated across a benchmark suite for a plurality of locations corresponding to paths at an environment setting and was found to deliver up to 10 times more resiliency to malicious AP attacks as compared to its unsecured counterpart.

In an aspect, a method is disclosed of configuring a neural network for fingerprint-based indoor localization, the method comprising obtaining, by one or more processors, a first training data set comprising measurements of strength of received radio signals transmitted by radio sources for a location; determining, by the one or more processors, for one or more of the radio sources for the location, a statistical distribution model (e.g., means and variance) of measurements of strength of received radio signals transmitted by the each radio sources for a respective location; generating, by the one or more processors, a second training data set from the first training data set by extrapolating measurements of strength of the received radio signals using the determined statistical distribution model; and training, by the one or more processors, the neural network using the first and second training data set, wherein the trained neural network is used for fingerprint-based indoor localization of a device (e.g., same or different device as that of the one or more processors) at the location.

In some embodiments, prior the training step, the method includes adding a set of random offset values or temporally correlated offset values to a map (e.g., vector) of the measurement of strength (e.g., RSSURSS) of the received radio signals associated with the first training data set.

In some embodiments, prior the training step, the method further includes adjusting (e.g., directly to the extrapolated value or indirectly to an intermediate value; could be addition, subtraction, multiplication, etc.) the extrapolated measurement of strength of the received radio signals with a set of random offset values or temporally correlated offset values.

In some embodiments, the set of random offset values is defined by analysis of potential spoofing or potential jamming (e.g., hypothetical or analyzed) of the radio sources at the location.

In some embodiments, the set of random offset values is determined from a pre-defined distribution.

In some embodiments, the pre-defined distribution for the set of random offset values is a random uniform distribution of measurement values over pre-defined range.

In some embodiments, in the statistical distribution model include a mean parameter and a variance parameter, and wherein the values of the mean parameter and the variance parameter are used for the extrapolation.

In some embodiments, the statistical distribution model is based on a Gaussian distribution.

In some embodiments, the statistical distribution model is based on at least one of Cauchy distribution, a t distribution, a chi-square distribution, an exponential distribution, a Weibull distribution, a lognormal distribution, a gamma distribution, and a power normal distribution.

In some embodiments, the method includes capturing (e.g., by the one or more processors or a different set of processors, e.g., run-time processors) the measurements of strength (e.g., signal strength measurements) of the first training data set as signal strength fingerprint vectors (e.g., RSSI/RSS fingerprint vector) for a number of locations; and converting each RSSI fingerprint vector into an image for a respective location.

In some embodiments, wherein the step of converting the RSSI fingerprint vector to the image includes normalizing RSSI/RSS values of RSSI/RSS fingerprint vector to a pre-defined range of pixel intensities of the image; and generating the image having a number of pixel that is greater than a number of radio sources.

In some embodiments, the method includes obtaining a third data set comprising measurements of strength of received radio signals transmitted by the radio sources at the location; generating an image from the measurements of strength for the given location; and determining a location of the device in the given location by applying the generated image to the trained neural network.

In some embodiments, the radio sources is selected from the group consisting of Ultra-Wide-Band (UWB) network radio, Bluetooth network radio, ZigBee network radio, and cellular networks radios.

In some embodiments, the radio sources comprise a plurality of Wi-Fi network radios.

In some embodiments, the training step is performed on a mobile device for localization of the mobile device at the location.

In some embodiments, the training step is performed on a cloud or remote server, the method further comprising transmitting, by the one or more processor, the trained neural network to a computing device for localization of the computing device.

In some embodiments, the training step secures the neural network against jamming and spoofing attacks at the location.

In some embodiments, the neural network comprises a convolutional neural network or deep neural network.

In another aspect, a non-transitory computer readable medium is disclosed comprising instructions stored thereon, wherein execution of the instructions by a processor (e.g., mobile device processor or remote/cloud server processor) cause the processor to obtain a first training data set comprising measurements of strength of received radio signals transmitted by radio sources for a location; determine for one or more of the radio sources for the location, a statistical distribution model of measurements of strength of received radio signals transmitted by the each radio sources for a respective location; generate a second training data set from the first training data set by i) extrapolating measurements of strength of the received radio signals using the determined statistical distribution model and ii) adding a set of random offset values to values of the extrapolating measurements; and train the neural network using the first and second training data set, wherein the trained neural network is used for fingerprint-based indoor localization of a device at the location.

In other aspect, a system is disclosed comprising one or more processors (e.g., wholly in mobile device or cloud/remove server, or distributed between the two); a memory having instructions stored thereon, wherein execution of the instructions by the one or more processors cause the one or more processors to obtain a first training data set comprising measurements of strength of received radio signals transmitted by radio sources for a location; determine for one or more of the radio sources for the location, a statistical distribution model of measurements of strength of received radio signals transmitted by the each radio sources for a respective location; generate a second training data set from the first training data set by i) extrapolating measurements of strength of the received radio signals using the determined statistical distribution model and ii) adding a set of random offset values to values of the extrapolating measurements; and training the neural network using the first and second training data set, wherein the trained neural network is used for fingerprint-based indoor localization of a device at the location.

BRIEF DESCRIPTION OF THE DRAWINGS

Embodiments of the present invention may be better understood from the following detailed description when read in conjunction with the accompanying drawings. Such embodiments, which are for illustrative purposes only, depict novel and non-obvious aspects of the invention. The drawings include the following figures.

Results.

Figures 18, 19:
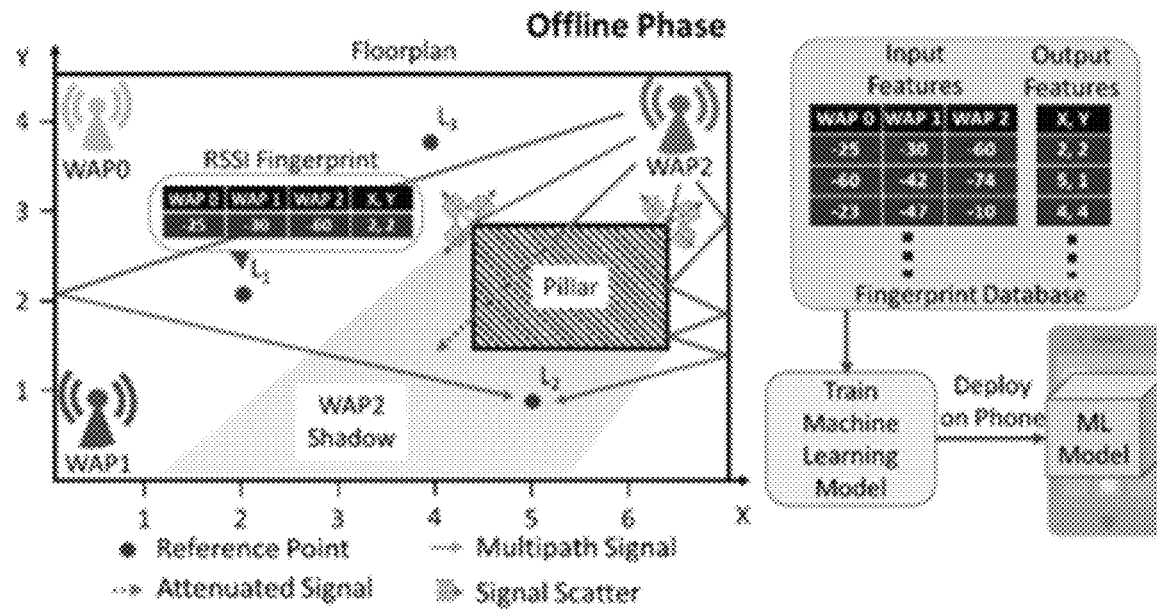

FIG. 18 illustrates an example radio signal propagation effect in a discussion of radio fingerprint-based indoor localization application and a process to perform the offline training of the exemplary S-CNNLOC in accordance with an illustrative embodiment.

FIG. 19 illustrates an example radio signal propagation effect in a discussion of radio fingerprint-based indoor localization application and a process to perform the online operation of the exemplary S-CNNLOC in accordance with an illustrative embodiment.

DETAIL DESCRIPTION

Each and every feature described herein, and each and every combination of two or more of such features, is included within the scope of the present invention provided that the features included in such a combination are not mutually inconsistent.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the list. For example, [15] refers to the fiftieth reference in the list, namely, A. Mittal, S. Tiku, and S. Pasricha, "Adapting Convolutional Neural Networks for Indoor Localization with Smart Mobile Devices," Great Lakes Symposium on VLSI (GLSVLSI), 2018. All references cited and discussed in this specification are incorporated herein by reference in their entireties and to the same extent as if each reference was individually incorporated by reference.

Example System

In an aspect, the exemplary method involves the modeling of vulnerabilities of deep-learning based indoor localization methodology to interference, such as spoofing or jamming attacks, and the subsequent generation of training data to provide to a deep neural network (e.g., convolutional neural network) to harden or make it less prone to such attacks.

Figure 1:
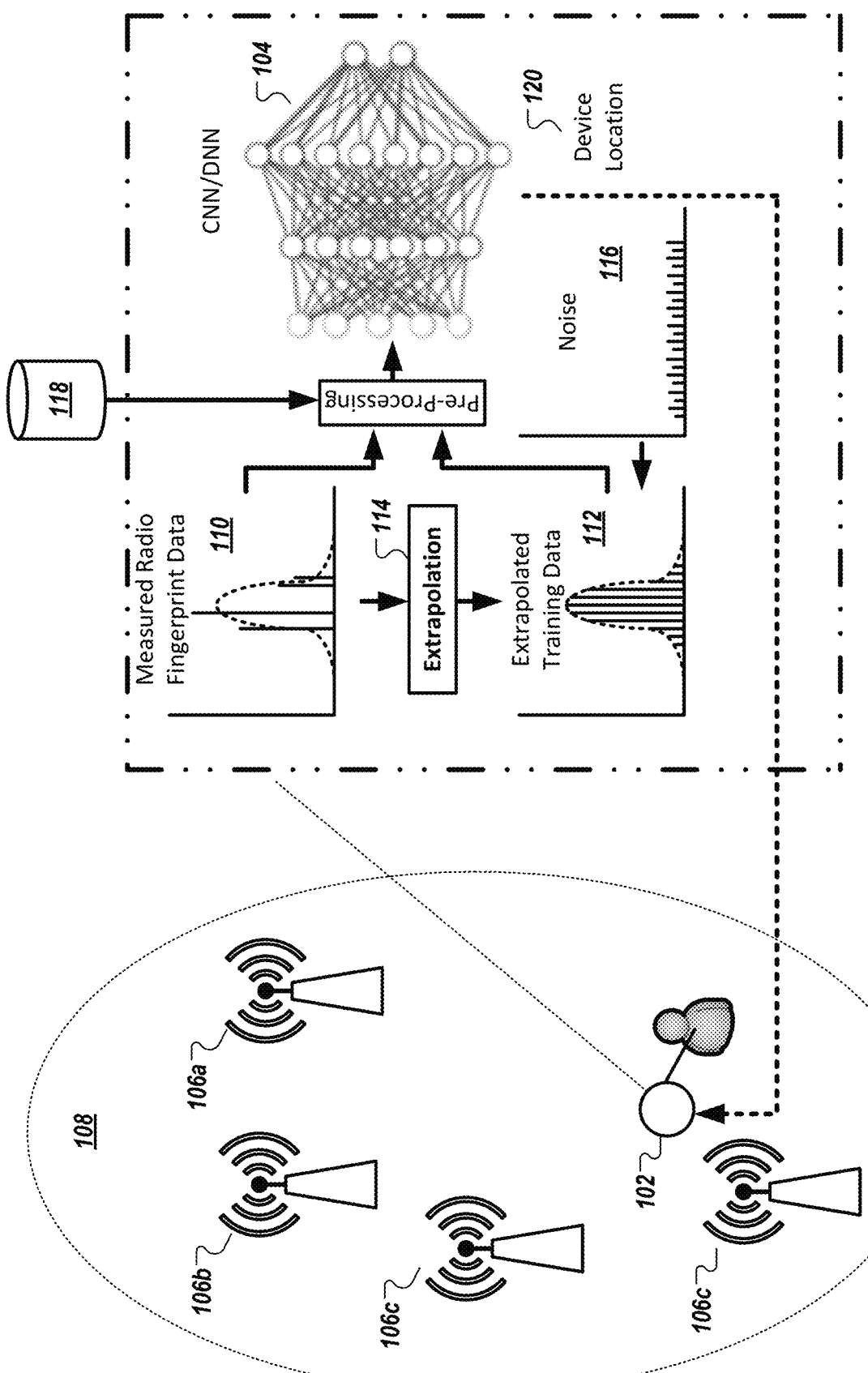
FIGS. 1 and 2 each shows an example system configured to execute a secured deep neural network for secured fingerprint-based indoor localization.
Figure 2:
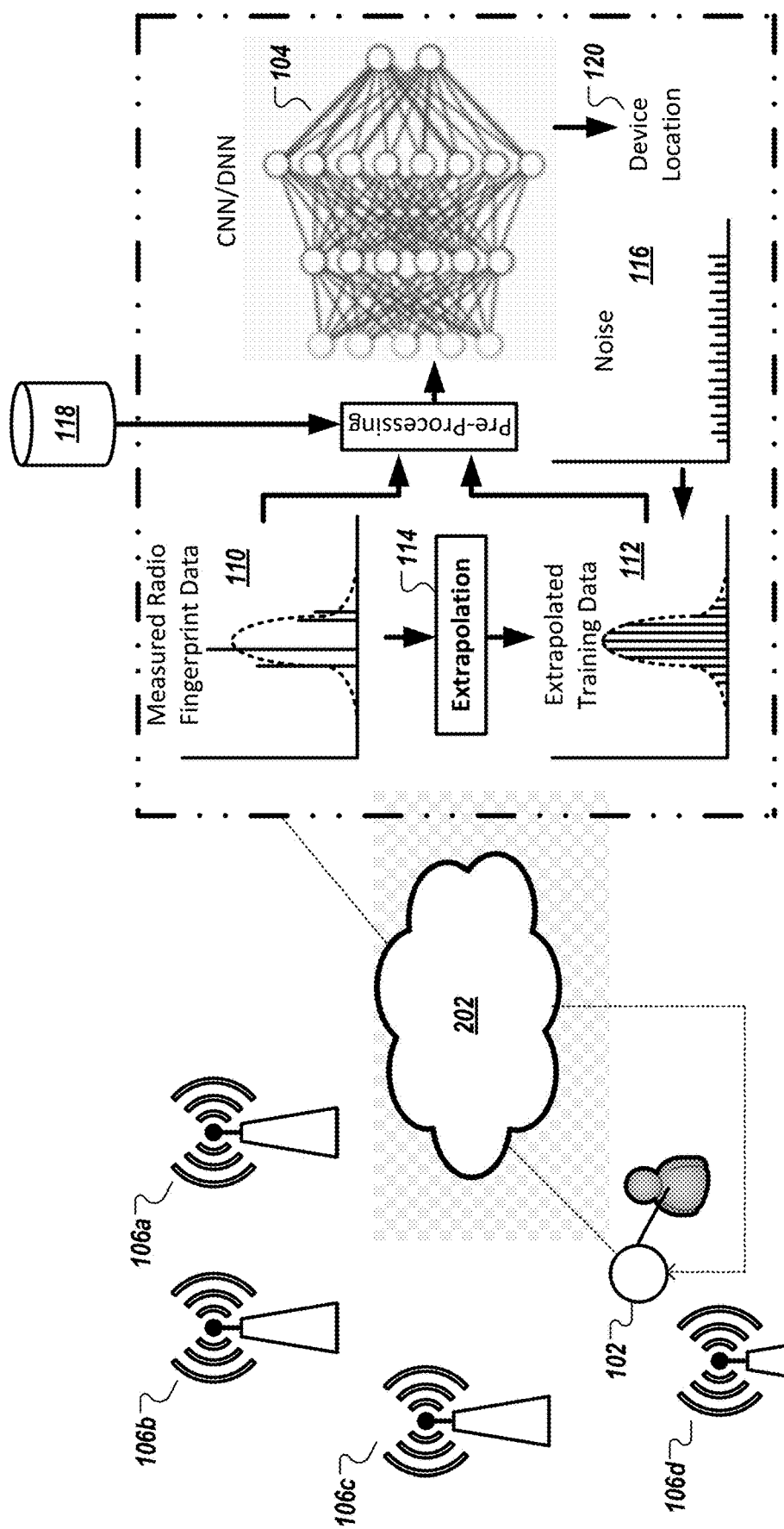

FIGS. 1 and 2 each shows an example system 102 (e.g., a mobile device) configured to execute a secured deep neural network 104 for fingerprint-based indoor localization. In FIG. 1, the secured neural network 104 is shown to be configured on the system 102. In FIG. 2, the secured neural network 104 is shown to be configured remotely, e.g., in a cloud infrastructure (202), and provided to the system 102. The term "secure" and "secured" as used herein refers to hardening of a neural network to external manipulation or interference, e.g., via a spoofing or jamming attack, as well as natural occurring phenomenon.

In FIG. 1, the system 102 receives radio signals from a plurality of radio sources 106 (shown as 106a, 106b, 106c, 106d) located at a given location 108 as an indoor fingerprint signature of the location 108. The signature may be represented as a parameter, a vector, a map, an image, or a combination thereof, by the system. The system 102 is configured to obtain a first training data set 112 (shown as "measured radio fingerprint data" 112) associated with measurements of strength of received radio signals transmitted by the radio sources 106 for the location 108. The system 102 then determines, for one or more of the radio sources for the location, a statistical distribution model (e.g., means and variance) of the measured data in the first data set 110 and generates a second training data set 112 (shown as "extrapolated training data" 112) from the first training data set 110 via a extrapolation operation 114. That is, the system 102 may use all of the radio sources that exists at a given location. In other embodiment, the system 102 may use only permanent or semi-permanent radio sources, e.g., excluding temporary radio sources.

The system 102 performs training of the neural network 104 using the first and second training data set (110 and 112). The training can be performed wholly on the system 102, or in part, e.g., with a remote/cloud infrastructure (see, e.g., FIG. 2). In some embodiments, the training may be performed using additional data sources or via a pre-generated neural network.

The system 102 may be a network device configured with a radio receiver and can measure radio signals from the radio sources (e.g., 106). In some embodiments, the system 102 is a smartphone, tablet, or a laptop. In other embodiments, the system 102 is a wearable or portable network device to which localization information outputted from the neural network 104 is desired, including medical and industrial equipment. In yet other embodiment, the system 102 is a navigation or positioning device or entertainment or shopping device.

Neural network 104 is a machine learning method and may include deep neural networks such as convolutional neural network. Learning can be supervised, semi-supervised or unsupervised.

Radio sources 106 may include networked-based radios, such as, but not limited to those in Wi-Fi networks, WiMax networks, Bluetooth networks, LTE networks/cellular networks (e.g., 4G, 5G, etc.), Zigbee networks, ISM networks, Ultra-Wide-Band (UWB) network. Radio sources may also be considered as any signal sources for locational including those naturally occurring such as those produced by the Earth's magnetic field.

A location 108 can refer to an indoor or an outdoor location to which a radio-fingerprint signature of the radio sources 106 may be measured. The term "fingerprint-based indoor localization" is a term of art that originated with indoor applications, but is understood to include outdoor environments and settings as well.

Referring still to FIG. 1, in another aspect, to further harden the deep neural network 104, the second training data set 112 may be adjusted with noise (shown as a "noise" data set 116), e.g., that mimics a malicious attack such as a spoofing attack or a jamming attack for a given location (e.g., 108). The noise (e.g., associated with 116) can be a hypothetical noise or an analyzed noise for the given location. Here, hypothetical may refer to a class of noise or interference that has been modeled for in similar or like settings. Hypothetical noise can also refer to a set of one or more user-defined noise values or parameters.

Example Method

Figure 3:
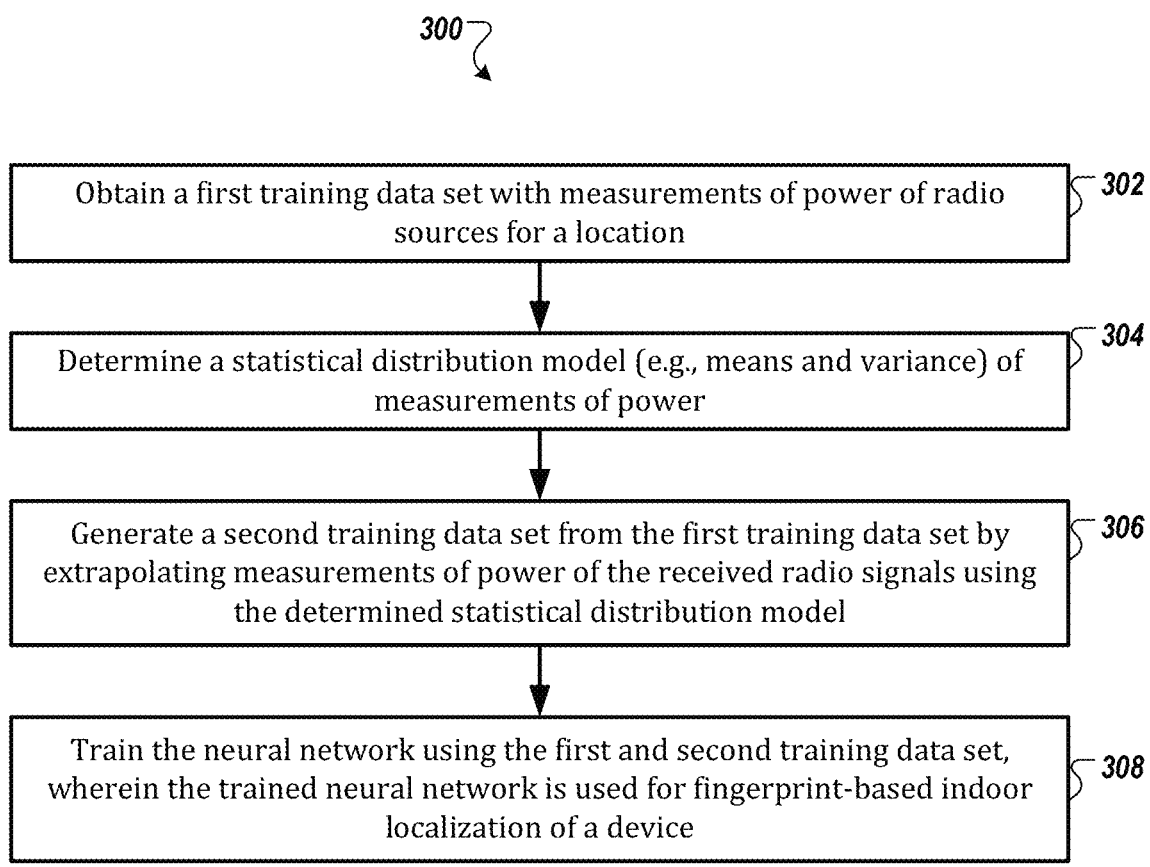
FIG. 3 shows an example method of configuring a secured neural network in accordance with an illustrative embodiment.
Figure 4:
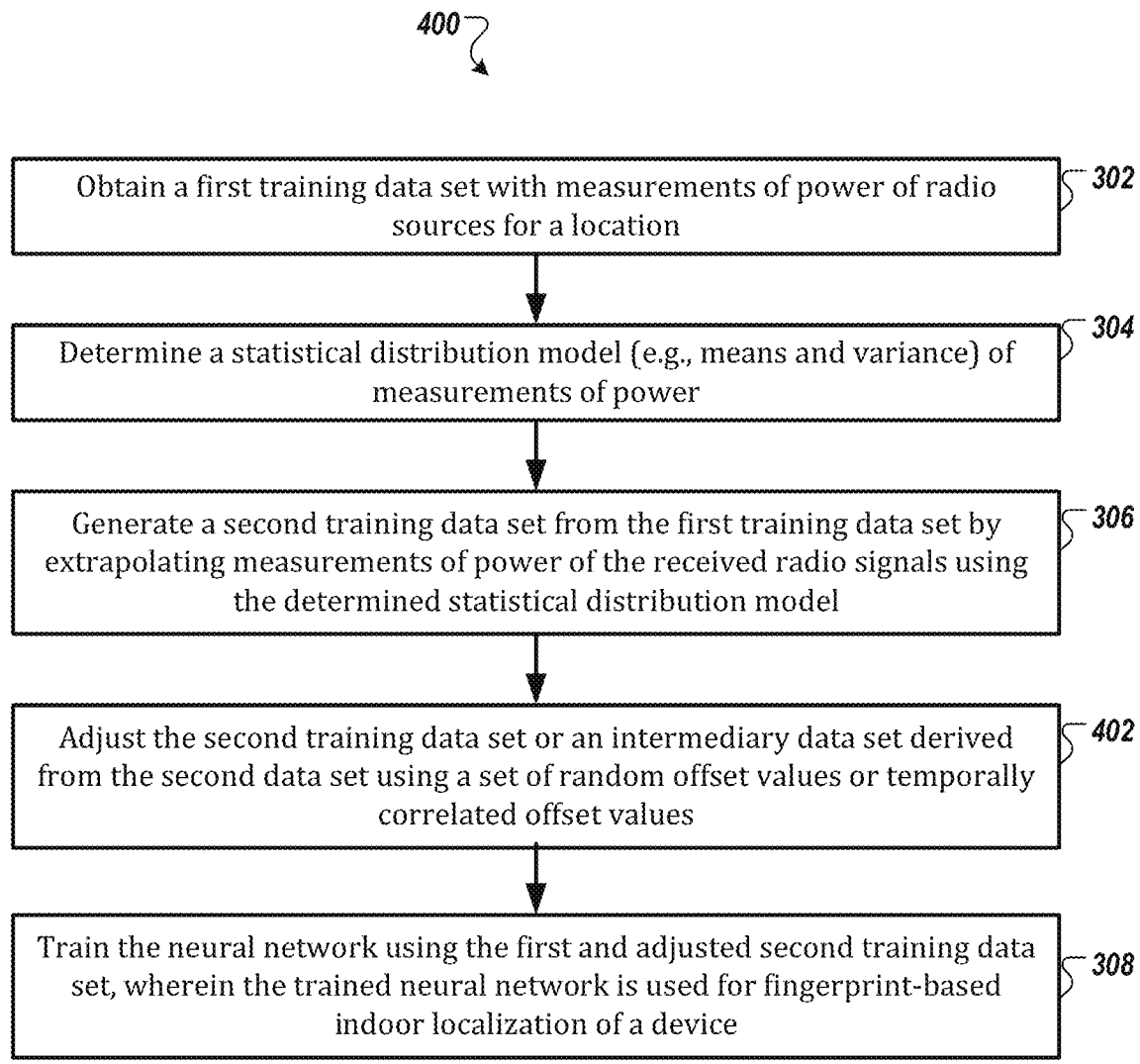
FIG. 4 shows another example method of configuring a secured neural network in accordance with an illustrative embodiment.

FIG. 3 shows an example method 300 of configuring a secured neural network (e.g., 104) in accordance with an illustrative embodiment. FIG. 4 shows another example method 400 of configuring a secured neural network (e.g., 104) in accordance with an illustrative embodiment.

In FIG. 3, the method 300 includes obtaining (302) a first training data set (e.g., 110) comprising measurements of strength of received radio signals transmitted by radio sources (e.g., 106) for a location (e.g., 108). The training maybe performed by a system (e.g., 102) that acquires the measurement of strength or may be a remote/cloud training system (e.g., 202).

The method 300 further includes determining (304), for one or more of the radio sources for the location, a statistical distribution model (e.g., means and variance) of measurements of strength of received radio signals transmitted by each radio sources for a respective location.

The method 300 further includes generating (306) a second training data set from the first training data set by extrapolating measurements of signal strengths of the received radio signals using the determined statistical distribution model. The extrapolation operation may be based any number of distribution models, including, for example, but not limited to, Gaussian, Cauchy distribution, t distribution, chi-square distribution, exponential distribution, Weibull distribution, lognormal distribution, gamma distribution, and power normal distribution. Other known distributions that represents external manipulators of interest may be applied. These can include malicious, e.g., from hackers, as well as non-malicious interference.

Figure 5:
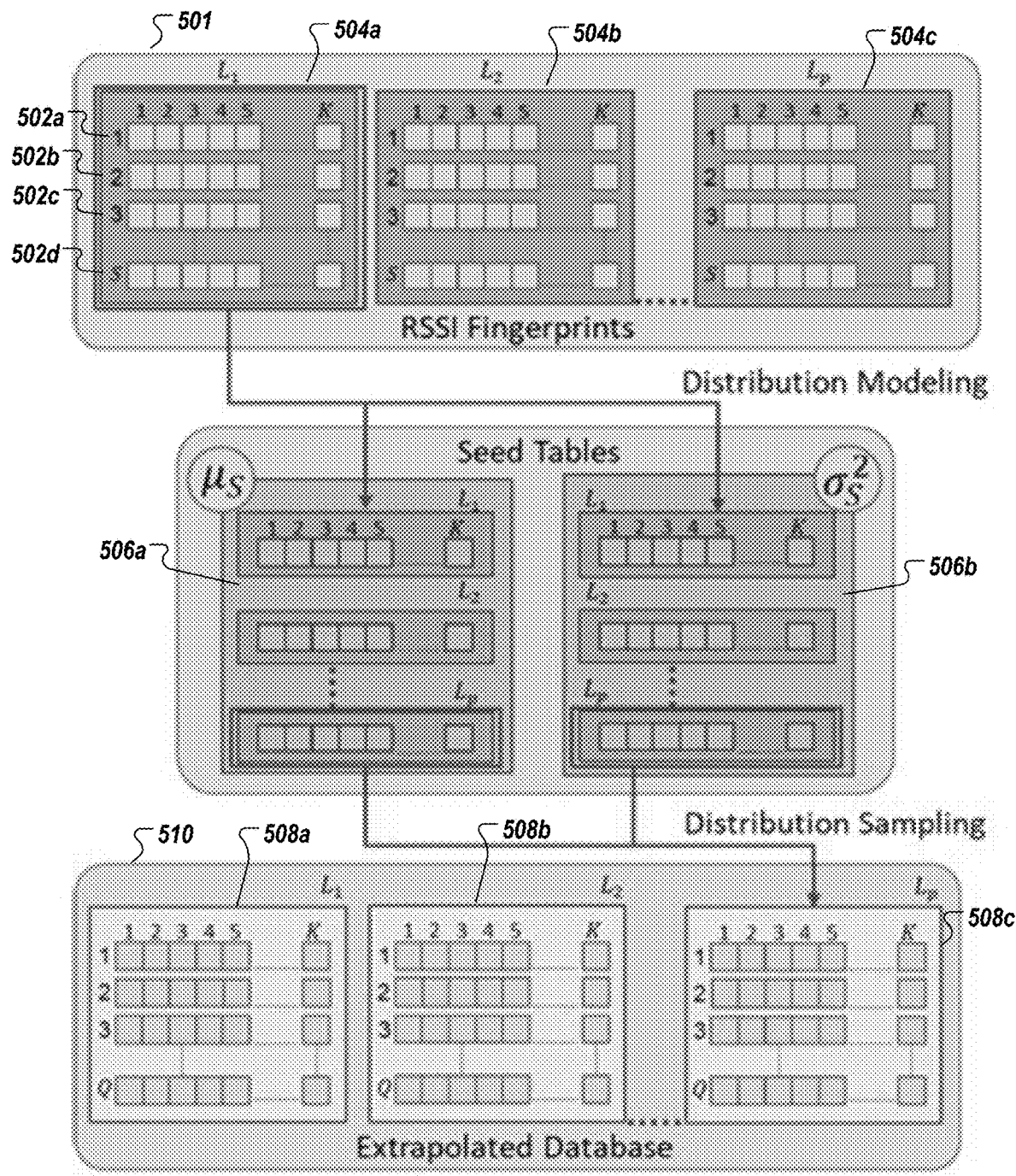
FIG. 5 is a diagram showing an example process of generating the second training data set from the first training data set by extrapolating measurements of signal strengths of the received radio signals for training in a convolutional neural network in accordance with an illustrative embodiment.

An example process is described in relation to FIG. 5 of generating (306) the second training data set from the first training data set by extrapolating measurements of signal strengths of the received radio signals for a convolutional neural network. Other method of generating data may be applied. The extrapolation may be based on statistical distribution model derived experimentally acquired measurements. In some embodiments, the statistical distribution model is used defined. In some embodiments, the statistical distribution model is determined for a set for pre-defined environment or setting.

The method 300 further includes training (308) the neural network using the first and second training data set, wherein the trained neural network is used for fingerprint-based indoor localization of a device (e.g., same or different device as that of the one or more processors) at the location. In some embodiments, the neural network is trained for the given location and transmitted to a remote or cloud server to provide to other devices in proximity to the location.

In some embodiments, the measured signal strength of the radio sources 106 representing the indoor fingerprint signature (e.g., RSSI or RSS fingerprint signature) of the location may be converted to an image to be used in the training. The training may involve other training data set or parameters (shown as 118).

Once trained, the secure neural network (e.g., 104) may be used in an indoor localization operation. The output of the secure neural network (e.g., 104) may include a location of the device (shown as 120). In some embodiments, the location data 120 is provided to an application executing on the system 102. In some embodiments, the location data 120 is provided to one or more remote/cloud servers executing a set of applications, e.g., that stores and/or uses the location data 120.

In FIG. 4, the method 400 entails further hardening the deep neural network 104 by adjusting (402) the second training data set 112 with a set of random offset values or temporally correlated offset values that correlates to or represents natural or malicious interferences such as malicious attack for a given location, e.g., spoofing attack or a jamming attack.

In some embodiments, the adjustment may be made with an addition, subtraction, multiplication operator. The adjustment is applied to the signal measurement data set in some embodiments. In other embodiments, the adjustment may be intermediary data set derived from the signal measurement data set, for example, vector data, map data, or image data derived from such measured data. In some embodiments, the adjustment are applied to stored data set that corresponds to simulated information.

In some embodiments, the noise is a randomly generated offset value derived from a predetermined distribution, e.g., of a spoofing or jamming signal, or localized interference. In other embodiments, the noise is a temporal correlation of such spoofing or jamming attacks or interference.

An example of generating (306) the second training data set from the first training data set by extrapolating measurements of signal strengths of the received radio signals for a convolutional neural network is described in relation to FIG. 5. As discussed, other method of generating data may be applied.

Example Method of Secure CNN Training

Figure 6:
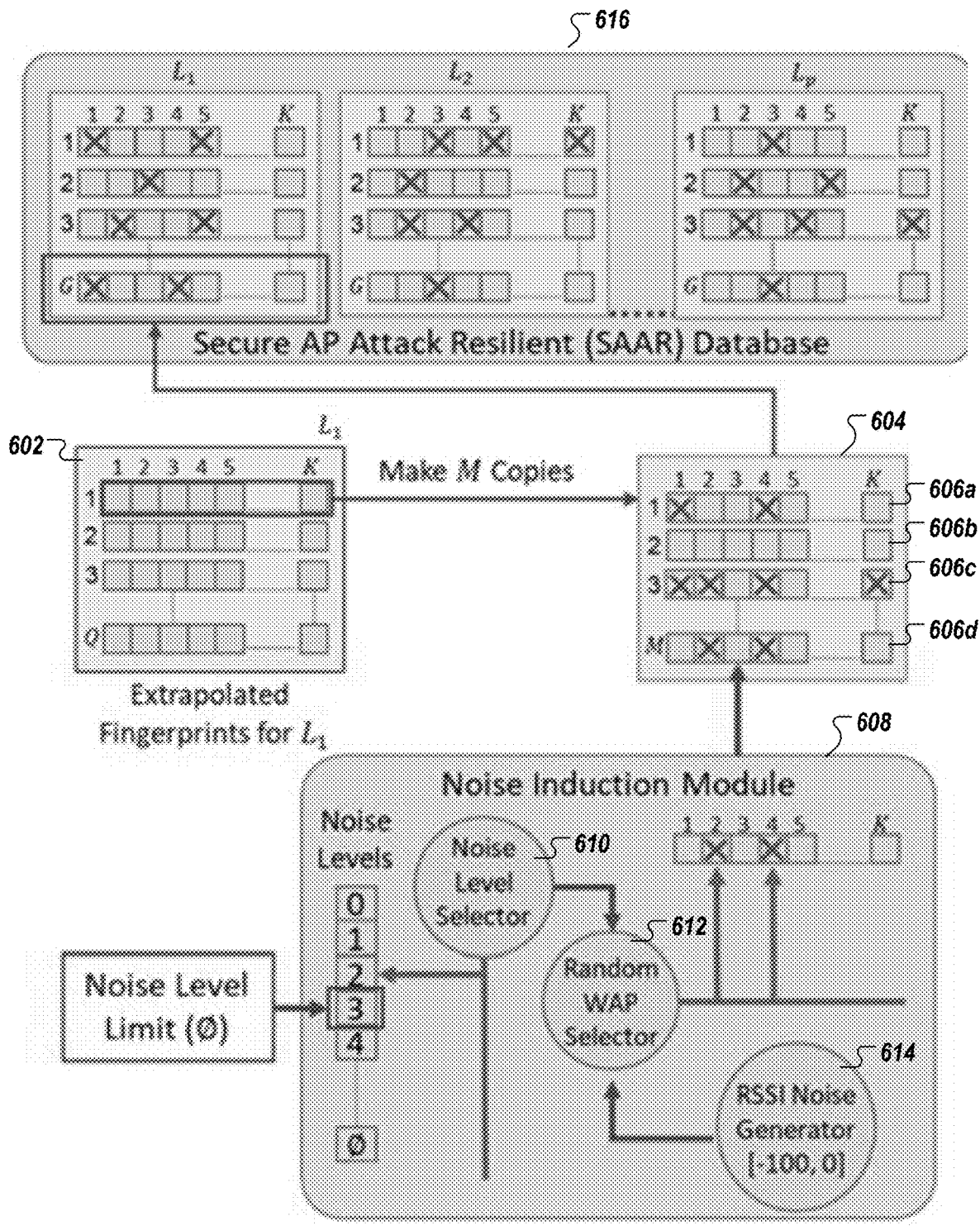
FIG. 6 is a diagram showing an example process of generating the second training data set from the first training data set by inducing noise in the training data set in accordance with an illustrative embodiment.

FIG. 5 is a diagram showing an example process of generating the second training data set from the first training data set by extrapolating measurements of signal strengths of the received radio signals within a convolutional neural network in accordance with an illustrative embodiment. FIG. 6 is a diagram showing an example process of generating the second training data set from the first training data set by inducing noise in the training data set in accordance with an illustrative embodiment.

Specifically, FIGS. 5 and 6 each shows an offline extrapolation operation of RSSI fingerprints and noise induction in the extrapolated fingerprints. The noisy and extrapolated set of RSSI fingerprints are converted into images and used to train the CNN model in exemplary S-CNNLOC system and method. The training may be performed once or periodically in the offline phase.

The induced noise, when used in the training of a secured neural network, further improves the hardening of the neural network to overcome the vulnerability of the neural network (e.g., CNNLOC [15]) against malicious WAP-based jamming and spoofing attacks in indoor environments. The method may be similarly applied to other deep neural networks.

One of shortcomings of fingerprint-based indoor localization (e.g., CNNLOC) may be attributed to the small number of fingerprint data considered per reference point (e.g., 10 fingerprints were described for the training in [15]). In general, deep learning models often require a large number of samples per class to produce commercially viable results. To sufficiently capture Wi-Fi fingerprints for fingerprint-based indoor localization application, large number of fingerprint signatures have been captured, which had been shown to be time-consuming. Since the capture is also performed manually, i.e., via user intervention, which makes conventional fingerprint-based indoor localization expensive to scale.

Extrapolation Operation. The exemplary system (e.g., 102) can address these limitations of neural networks by extrapolating the acquired offline fingerprint database 501 comprising a subset of the desired training data set to obtain a larger number of samples per reference point and using the extracted data set as additional data for the training data set. The term "offline" generally refers to processes involving data collection and model training. Offline may also refer to the setting up of the system to the point that it can be used to track a person or object. Once the system has been deployed and can be used to track a person or object—that is online.

In FIG. 5, the system is shown to sample S number RSSI fingerprints 502 (shown as 502a-502d) at each location L

504 (as reference point) (shown as location "$L_1$" (504a), "$L_2$" (504b), to "$L_p$" (504c)). Each of the RSSI fingerprint is shown as a RSSI vector having K number of access points (e.g., WAPs), e.g., where the vector size is K. In the exemplary method, the RSSI fingerprint of a given can be manually collected at given location "P" and used as an offline fingerprint database, which may be used in the training on the network device or at a remote/cloud server.

The distribution of each WAP RSSI at a given location may be modeled by its mean and variance value. This process may be similarly applied for any number of locations, i.e., repeated for each reference point in the offline fingerprint database. In FIG. 5, the mean and standard deviation data along with the reference location information are temporarily stored in tabular form and are referred to as the seed tables. The seed tables can be represented as Equation 1.

$$\mu_{S(i,j)}, \sigma_{S(i,j)}^2, i \in [1,K], j \in [1,P] \quad \text{(Equation 1)}$$

In Equation 1, $\mu_{S(i,j)}$ and the $\sigma_{S(i,j)}^2$ are the tables that include the means and variances of S number of WAP RSSIs for each given location. In FIG. 5, the mean and variance seed tables 506 (shown as 506a and 506b) are then used to extrapolate a larger fingerprint database and thus generate a new offline fingerprint 508 (shown as 508a, 508b, 508c) for the given reference point. In some embodiments, the system (e.g., 102) is configured to randomly sampled Q times the normal distribution based on the mean and variance (from the seed tables) for each WAP RSSI in each reference point fingerprint, e.g., as provided in Equation 2.

$$RSSI_{(i,j)} \sim N(\mu_{S(i,j)}, \sigma_{S(i,j)}^2) \forall i \in [1,K], j \in [1,P] \quad \text{(Equation 2)}$$

In Equation 2, RSSI(i, j) is the RSSI in dBm of the $i^{th}$ WAP at the $j^{th}$ reference point, and N represents the normal distribution. By randomly sampling each WAP from the reference point in seed tables, the system (e.g., 102) generates Q new RSSI fingerprint vectors for the given reference point. Through the random sampling-based data extrapolation approach, the system (e.g., 102) can capture different combinations of RSSI values in a fingerprint and also scale the size of the instant offline dataset beyond the few samples that were collected in the offline phase. The complete set of Q RSSI vector fingerprints per reference point is the extrapolated fingerprint database. The extrapolated fingerprint database 510 and the acquired fingerprint database 501 are then used in the subsequent training. In some embodiments, the extrapolated data set 510 are using the neural network training. In other embodiments, the extrapolated data set 510 and/or acquired fingerprint data set 501 are adjusted by induced noise operations described herein.

Malicious Behavior Induction.

FIG. 6 is a diagram showing an example process of generating the second training data set from the first training data set by inducing noise in the training data set in accordance with an illustrative embodiment.

From a study analyzing CNN-based indoor localization, it is observed that fluctuations in one individual pixel value of the Wi-Fi fingerprint image (where each pixel corresponds to a measured signal strengths for a given access point) can lead to significant deterioration in the localization accuracy. Indeed, trained conventional CNN models are generally good at making predictions for images (or RSSI information) that it has previously seen. To this end, a CNN model used in fingerprint indoor localization can be vulnerable to minor deviations or noise in the images, particularly where the noise is induced by WAP-based attacks or Wi-Fi jammer attacks in the online phase.

CNN models are designed to recognize one or more patterns within images that may be very different from each other, or may only have slight differences from each other. Indeed, a relatively small-scale variations within and between images constructed from WAP RSSI values (for the purpose of pattern recognition for indoor localization) can be learned to be ignored by a CNN model. The exemplary method can harden neural network against noise by integrating an image filter with the CNN prediction model.

The exemplary system (e.g., 102) can use a single CNN-model for both image denoising and classification. Based on a conducted study, it is observed that malicious behaviors such as WAP spoofing, WAP jamming, and even environmental changes can be model as random fluctuations in the fingerprint data to which the secure the CNN model can be made resilient to such fluctuations via the method discussed herein. Put another way, the secured neural network (e.g., 102) can be taught to ignore noise (due to malicious WAPs) in an inference phase.

Previous work [38] have used a noisy image to provide noise resilience for general image processing with CNNs. However, such approach would be inefficient for the exemplary system as the technique [38] employs different CNNs for denoising and for classification. The exemplary system improves on computing technology in reducing prediction time and memory footprint requirement, making the application more suitable for resource-constrained mobile devices.

In FIG. 6, for each fingerprint in the "clean" (mWAP0) extrapolated database (shown as 602), M copies are constructed in a separate table 604. Then each of the M fingerprint vectors (shown as 606a, 606b, 606c, 606d) are fed to a noise induction module 608 that introduces random fluctuations in the WAP RSSI values, based on an upper limit (Ø) that is set by the user.

Random Noise Offset. As noted above, the training data set may include induced noise comprising random noise offset values. To generate random noise offset training data set, in FIG. 6, a noise induction module 608 is shown comprising a noise level selector 610, a random WAP selector 612, and a noise generator 614.

For a given RSSI vector (shown as 616), the noise level selector submodule 612 selects values from a discrete uniform distribution such that $\theta \sim U\{0, \emptyset\}$, where $\theta$ is the number of WAPs in the RSSI vector whose RSSI value would be altered by the noise induction module. The random WAP selector 612 then arbitrarily identifies the set of WAP candidates $W_\theta$, where each WAP candidate $w_c$ is selected between 1 and K, e.g., as described in Equation 3.

$$w_c \sim U\{1,K\}, c \in [1,\theta]$$

$$\text{s.t., } W_\theta = \{w_1, w_2, w_3 \ldots w_\theta\} \quad \text{(Equation 3)}$$

The newly generated RSSI vectors ($RSSI_{(i,j)}^{Noisy}$) are tainted by random noise at the $i^{th}$ WAP position, if the WAP was chosen by the random WAP selector submodule 612, e.g., as shown in Equation 4.

$$RSSI_{(i,j)}^{Noisy} = \begin{cases} I, & \text{if } i \in W_\theta \\ RSSI_{(i,j)}, & \text{otherwise} \end{cases} \quad \text{(Equation 4)}$$

$$j \in [1, P], 1 \sim U\{-100, 0\}$$

In Equation 4, I represents noise sampled from a discrete uniform distribution between −100 dBm to 0 dBm, RSSI(i, j) is the clean (untainted) RSSI, e.g., from Equation 2, and P is the number of reference points on a benchmark path for which fingerprint data has been collected. Indeed, the exemplary system (e.g., 102) can generate RSSI vectors that may have up to Ø noise-induced RSSI WAP values. Having a uniform distribution of 0 to Ø malicious WAPs may ensure that the secured CNN model trained using the generated data is resilient to a range of malicious WAP numbers and locations in the localization environment in the testing phase.

Where the process is applied for all fingerprints in the clean training database 616, the system can generate G=Q×M fingerprints per reference point, though only a portion of the fingerprints may be modified or may be modified upon demand (e.g., when the device is near or located at one of the locations). The final number of RSSI fingerprints in the AP attack resilient (SAAR) database constructed by the processes for all fingerprints in the clean training database is G×P, where P is the number of reference points on a benchmark path. The SAAR training database is then used to train the CNN model which is subsequently deployed as an app on a mobile device and used to make online (real-time) location predictions for the user carrying the mobile device.

Temporally Correlated Offset.

As noted above, the training data set may include induced noise comprising temporally correlated offset values. Indeed, spoofing and jamming attacks can be made more targeted, e.g., via use of targeted pattern of temporally correlated offset values (instead of only random).

Figure 7:
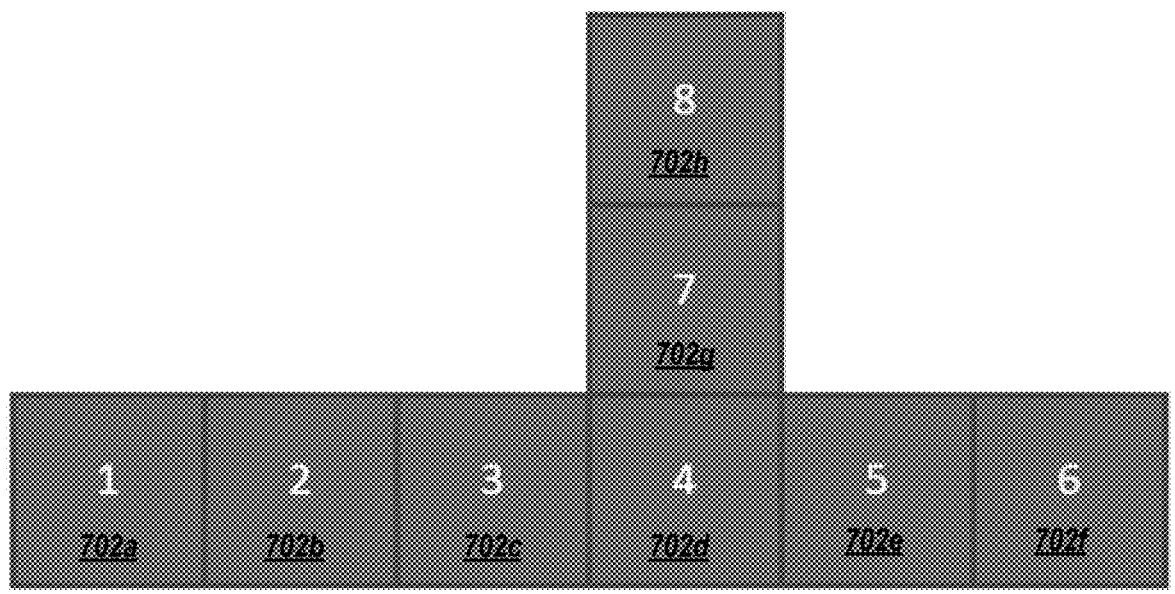
FIG. 7 shows an example of targeted attack to which temporally correlated offset values can be generated in accordance with an illustrative embodiment.

FIG. 7 shows an example of targeted attack to which temporally correlated offset values can be generated in accordance with an illustrative embodiment. In FIG. 7, an example floorplan is shown with different reference points, e.g., access point "1", "2", "3", . . . , "8" (shown as 702a-702h). An attacker/adversary may try to force an indoor localization model to predict that the user is at location "5", when the user has actually taken a left and is at location 7. This may be done by specifically targeting radio fingerprint signatures for location "7" to generate a noise pattern/spoofing pattern that the deep learning model would identify as location "5". In another example, radio fingerprint signatures for location "8" can be altered such that deep learning model specifically classify a location "6" from the measured/altered signals. Indeed, in these scenarios, a timing and pattern of spoofing and jamming attacks can be ascertained to alter the fingerprint signature of the location to match a false user movement and true location.

To generate temporally correlated offset values, similar scenarios may be simulated or analyzed to produce tainted fingerprints and use those fingerprints to train the neutral network model.

Secured Convolution Neural Networks

Convolutional neural networks (CNNs) are a form of deep neural networks that are specially designed for image classification. They have been shown to deliver significantly higher classification accuracy as compared to conventional DNNs due to their enhanced pattern recognition capabilities.

Figure 8:
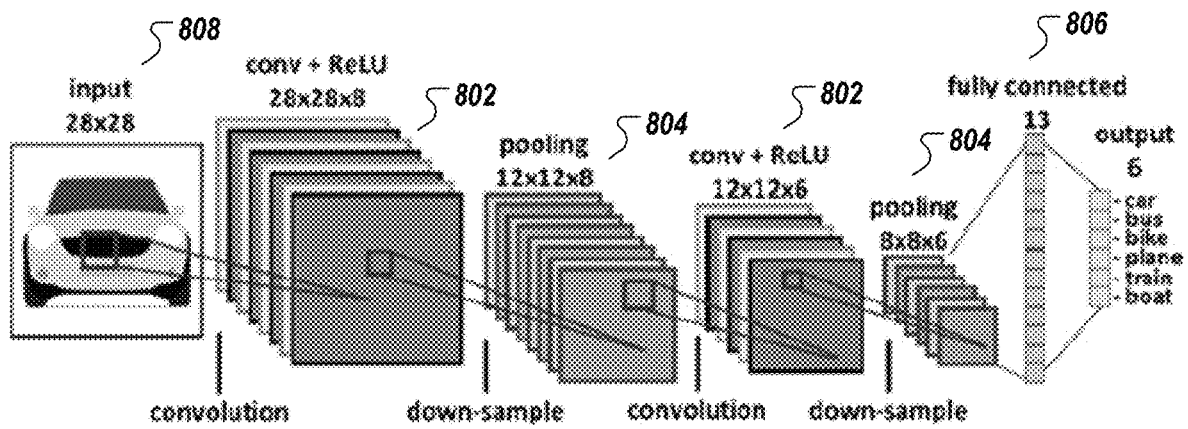
FIG. 8 shows an example secured CNN model in accordance with an illustrative embodiment.

FIG. 8 shows an example secured CNN model 800 in accordance with an illustrative embodiment. The secured CNN 800 may include convolution+ReLU (Regularized Linear Unit) 802, pooling layers 804, and fully connected layers 806. The secured CNN model 800 is configured to learn patterns, e.g., in images, by focusing on small sections of the image, known as a frame, from the input layer. The frame may move over a given image in small strides. Each convolutional layer may include filter matrices that hold weight values. In a first layer, convolutional operations (dot products) may be performed between the current input frame 808 and filter weights followed by the ReLU activation function. The pooling layers 804 may be responsible for down sampling the output from a convolution+ReLU units 802, thereby reducing the computational requirements by the next set of convolution layers. The final classification may be performed using a set of fully connected layers 806 (e.g., utilizing a SoftMax activation function) to calculate the probability distributions for various classes. In the testing phase of a CNN model, the class with the highest probability may be selected as the output prediction. FIG. 8 shows an example for a classification of vehicles.

Additional examples of CNNs is described in [15] and [33]. CNNs may have advantages over DNNs when used for localization in having less computational complexity with increasing hidden layers. Further, the pooling layers in CNN models may reduce the overall footprint after each convolutional layer, thereby reducing the computation required by the successive set of layers. Both secured CNN and DNN may be scalable though CNN may be better [33]. CNN may also provide better accuracy at identifying patterns in image data than DNNs, which make CNNs a more viable solution for certain scenarios, e.g., to overcome device heterogeneity issues (that are more readily apparent in image form) with indoor localization when using mobile devices [36].

To generate the secured neural network (e.g., 104), in some embodiments, the method may involve two operations in an offline phase in which the first operation involves the capturing of RSSI fingerprints for different locations, and then converting each RSSI fingerprint vector that is tied to a location (reference point) into an image tied to the same location. The second operation of the offline phase, in some embodiments, is the training of a secured CNN model (e.g., 104) using the images created previously. In the online phase, the same process is used to create an image (based on observed RSSI values), which is fed into the trained secured CNN model (e.g., 104) for location prediction.

Figure 9:
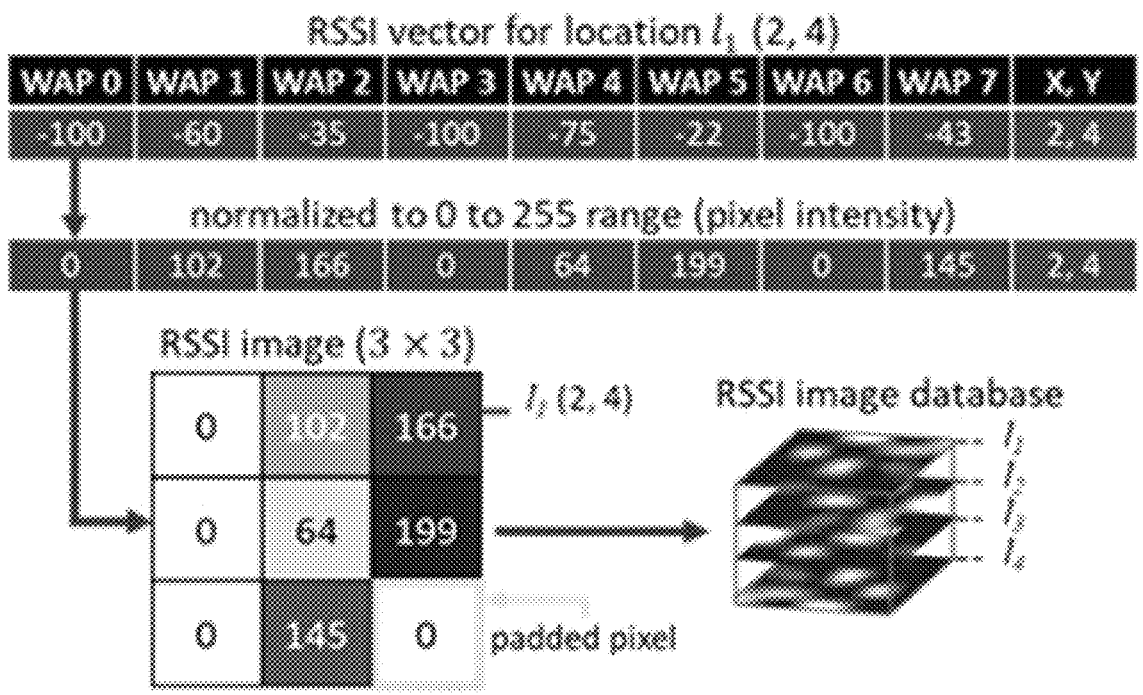
FIG. 9 is a diagram showing a method to configure a secured convolutional neural network from training data sets in accordance with an illustrative embodiment.

FIG. 9 is a diagram showing a method to configure a secured convolutional neural network from training data sets in accordance with an illustrative embodiment. The method 900 includes converting an RSSI fingerprint vector acquired from measured data into an image. In FIG. 9, the RSSI vector includes RSSI values in the range of −100 to 0 dBm (low signal strength to high signal strength). The system normalizes these values to a range, e.g., 0 to 255, corresponds to the pixel intensity range of the image. The dimensions of the RSSI image are selected to be the closest shape (e.g., square) to the number of visible WAPs on the path. For example, in FIG. 9, for a RSSI vector having a size of 8, an image having 9 pixels is selected for a 3×3 image. Additional pixel may be padded. The generated image is then used in the offline database of images to train a CNN. During the online phase, the same process may be used to generate an image to provide a location output from an input RSSI vector generated from a given observed location. The system may sort the fingerprint signature so specific MAC IDs is located at a same location between the training (offline database) and the online database so the images between the two databases will be aligned to one another. Where a specific MAC ID (e.g., an access point) observed in the offline phase is not available in the later online phase, the pixel value corresponding to that MAC ID may be set to zero or null for the online phase.

RSSI refers to a measurement of the power of a received radio signal transmitted by a radio source. The RSSI is captured as the ratio of the received power ($P_r$) to a reference power ($P_{ref}$, usually set to 1 mW). The value of RSSI is reported in dBm and is given by the following equation.

$$RSSI\,(dBm) = 10 \cdot \log\frac{P_r}{P_{ref}}$$

The received power ($P_r$) is inversely proportional to the square of the distance (d) between the transmitter and receiver in free space and is given by the following equation:

$$P_r = P_t \cdot G_t \cdot G_r \left(\frac{\lambda}{4\pi d}\right)^2$$

where $P_t$ is the transmission power, $G_t$ is the gain of transmitter, $G_r$ is the gain of receiver, and $\lambda$ is the wavelength. This inverse relationship between the received power and distance has often been used by researchers to localize wireless receivers with respect to transmitters at known locations, e.g., estimating the location of a user with a Wi-Fi capable smartphone from a Wi-Fi AP. However, the free space models based on these equations may not extend well for practical applications as the propagation of radio signals is often influenced by various effects.

Experimental Results and Examples

Location Security Analysis.

A study was conducted to assess WAP RSSI vulnerability using deep learning-based indoor localization as described in [15] (CNNLOC) and [17] (which uses DNNs). The study modeled two deep learning frameworks and contrasted their performance for two indoor paths (namely, an Office and a Glover path) shown in FIG. 10. The exemplary system and method may be applied for a varying number of malicious AP nodes as well as across a diverse set of indoor paths.

Figure 10:
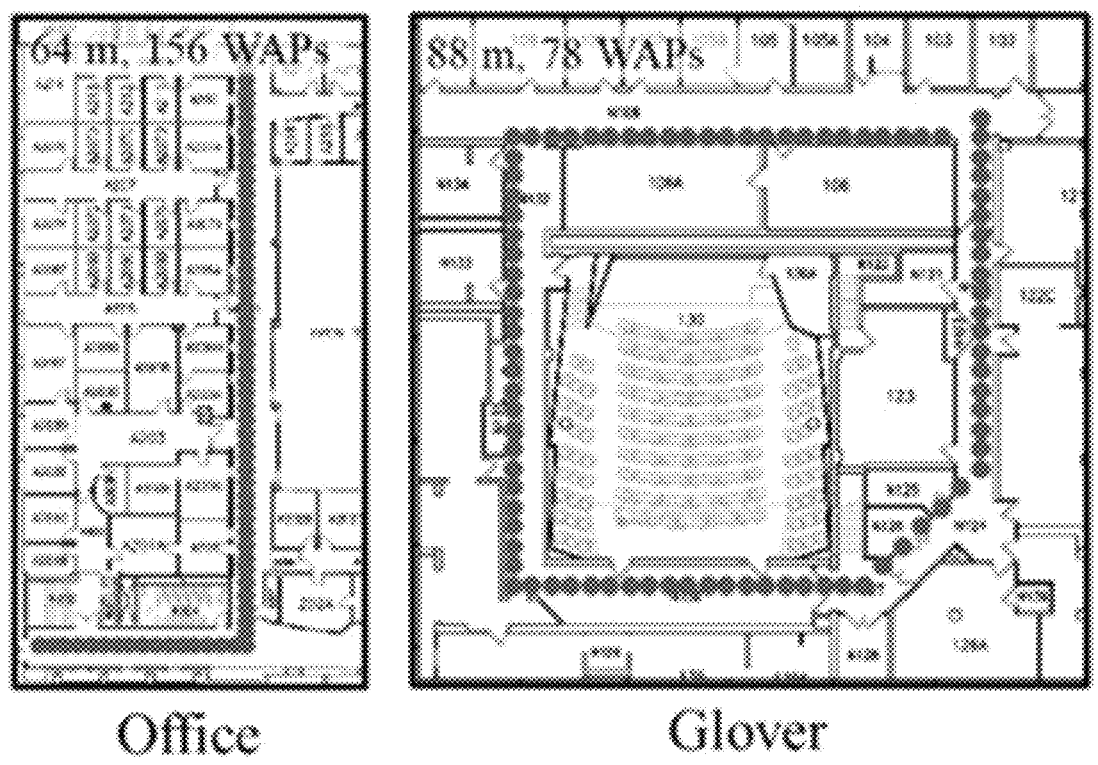
FIG. 10 shows locations of a study conducted to evaluate the performance of the secured convolutional neural network, in accordance with an illustrative embodiment.

In FIG. 10, the "Office" and "Glover" paths are 64 and 88 meters long, respectively, and the reference locations used to capture Wi-Fi RSSI are marked by dots. An HTC U11 smartphone [39] was used to capture Wi-Fi fingerprints along the indoor paths and to test for localization accuracy.

A WAP-based security attack may include either WAP spoofing or WAP jamming. To establish the impact of such WAP-based attacks on localization accuracy, the study identified the behavior of the Wi-Fi RSSI fingerprints in the presence of one or more malicious WAP nodes (Wi-Fi spoofers/jammers). It is expected that the tainted fingerprint in the online phase would exhibit one of three behaviors: 1) the RSSI values from one or more visible WAPs exhibits a significant increase or decrease as compared to its offline counterpart, 2) a WAP whose RSSI value is usually not visible at the current reference point becomes visible, and 3) a WAP that is usually visible at the current reference point is no longer visible. With the range of received RSSI values from WAPs being between −100 to 0 dBm, the impact of the malicious WAP behavior on the fingerprints was assessed by inducing fluctuations in WAP RSSI values within this range, for the impacted fingerprints.

Figure 11A:
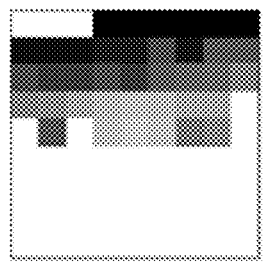
FIGS. 11A-11F show fingerprint images generated from RSSI vectors with progressively induced random noise in accordance with an illustrative embodiment.
Figure 11B:
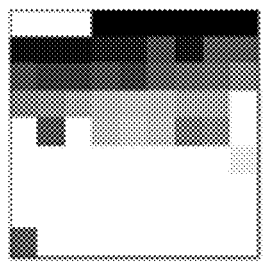
Figure 11C:
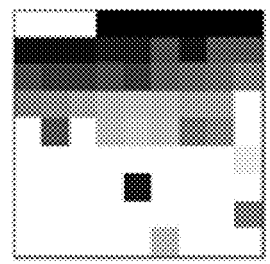
Figure 11D:
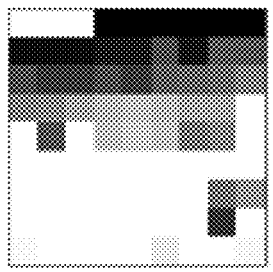
Figure 11E:
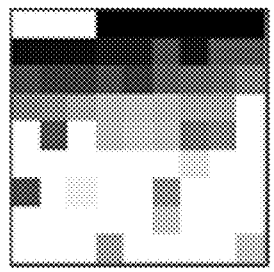
Figure 11F:
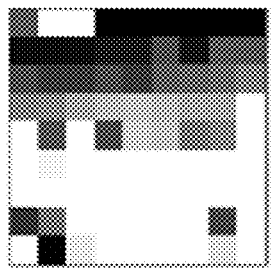

In FIGS. 11A-11F, fingerprint images are shown generated from RSSI vectors using the methodology described in CNNLOC [15]. Each image has a resolution of 9×9. In FIG. 11A-10F, each RSSI vector (fingerprint) for 78 WAP is shown as an image having a resolution of 9×9. In FIG. 11A, the original image is shown and is not tainted by malicious WAPs in the surrounding area. In FIG. 11A, "0" malicious WAPs are shown ("mWAP0"), while FIGS. 11B-10F shows 2, 4, 6, 8, and 10 malicious WAPs respectively (and labeled as "mWAP2", "mWAP4", "mWAP6", "mWAP8", and "mWAP10").

As shown in FIGS. 11B-11F, the modified pixel values can be visually identified, and simple image local smoothing filters [34] may be applied to remove them. However, such filtering is not always possible. For instance, in FIG. 10D with 6 malicious WAPs, it can be observed that only 5 tainted pixels that are visually decipherable as compared to the untainted image in FIG. 11A. Indeed, the sixth noisy pixel was too small to be visually detected, but unfortunately, can be substantial to impact on localization accuracy. Such scenarios also exist for the case of mWAP8 and mWAP10 shown in FIGS. 11E and 11F, respectively.

To test the vulnerability of deep learning-based indoor localization frameworks in the presence of malicious WAPs, the study analyzed the impact of a varying number of malicious WAPs on the localization accuracy of a CNN-based [15] and a DNN-based [17] indoor localization framework.

Figure 12A:
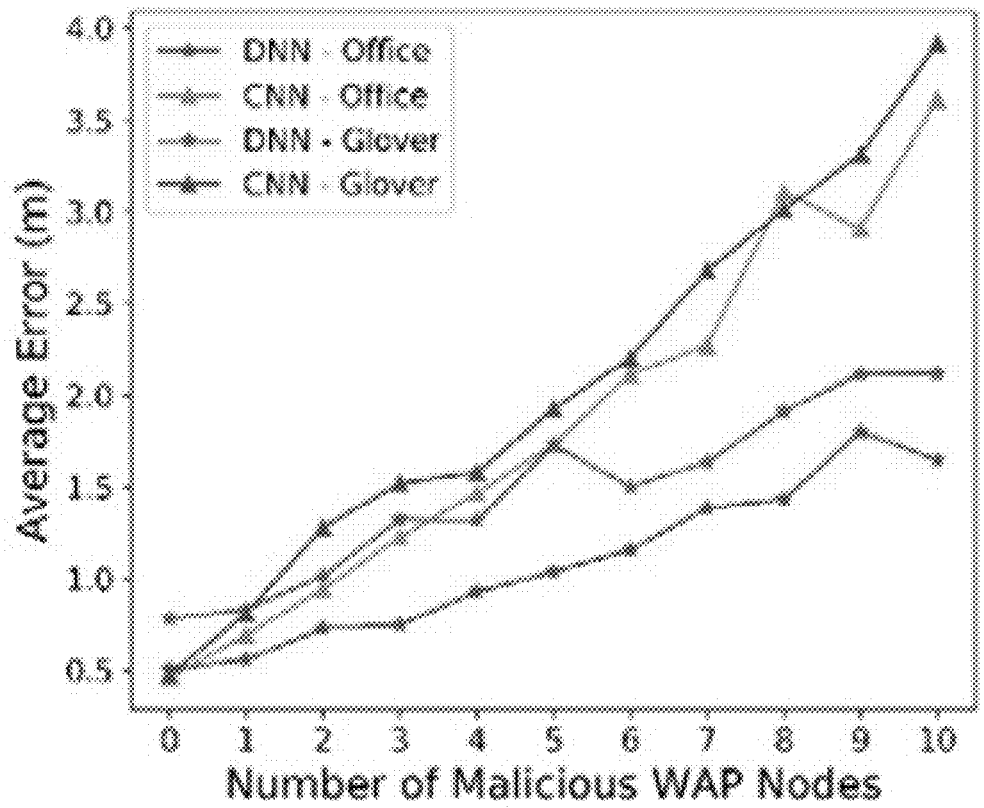
FIGS. 12A and 12B each shows experimental results from the study conducted at the locations of FIG. 10 of the impact of malicious WAPs on deep-learning model accuracy of unsecured neural networks in accordance with an illustrative embodiment.

FIG. 12A shows experimental results from a study conducted at the locations of FIG. 10 of the impact of malicious WAPs on deep learning model accuracy. In the study, the average indoor localization error was captured for the Office and the Glover paths for an increasing number of malicious WAP nodes (along the x-axis). For a scenario with malicious WAPs (e.g., mWAP=1), the study randomly selected the location of the malicious WAP over a 100 trials and averaged the resulting localization error. In FIG. 12A, the study observed that the average localization error of both CNN and DNN learning models increased monotonically in a majority of cases. The results highlighted the vulnerability of deep neural network based indoor localization models towards WAP-based attacks. Also, the CNN models for both paths appears to be more vulnerable to malicious WAP-based attacks as compared to the DNN model. Indeed, CNN models may be more sensitive to changes in patterns in the image as compared to variations across RSSI value inputs for a DNN model.

Figure 12B:
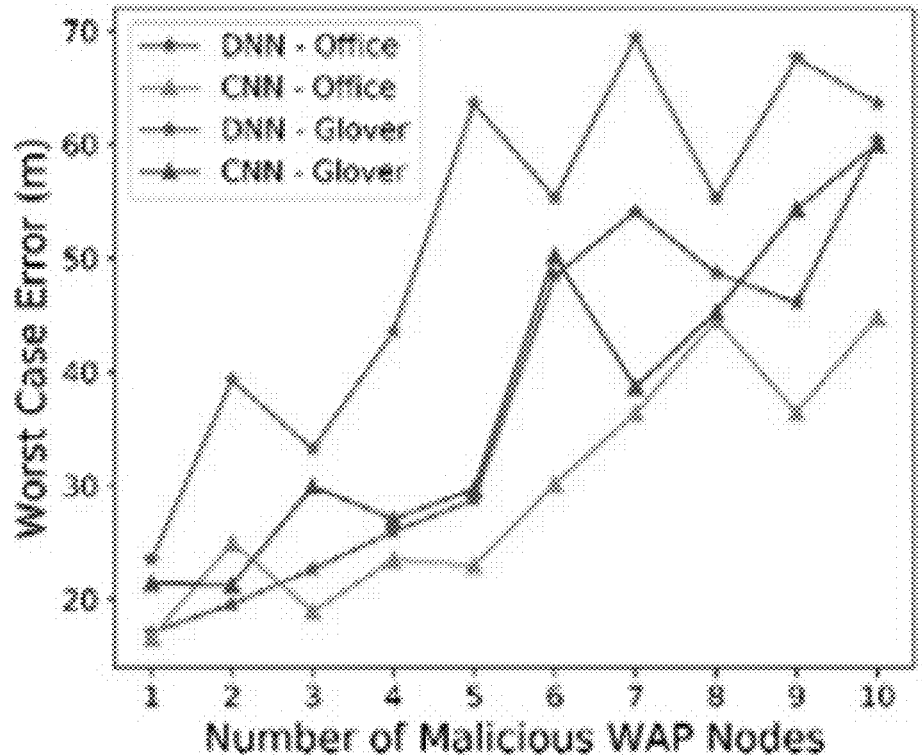

To further analyze the accuracy degradation of these deep learning models, the study assessed the worst-case localization error for the two deep learning models. FIG. 12B shows experimental results from the study conducted at the locations of FIG. 10 of worst-case localization errors for DNN and CNN models. In FIG. 12B, with increased number of malicious WAPs, the localization errors of each models are observed to be significantly higher than the average errors shown in FIG. 12A. Indeed, in FIG. 12B, with only 1 malicious WAP, the localization error in the worst case can be manipulated to be higher by up to 20 times for both paths and both deep learning models. As observed, the worst-case localization error for the CNN model can go above 50 meters with only 6 malicious WAPs (for the Glover path), which is of sufficient distance to place a user's predicted location at a completely different area on an indoor floorplan. The DNN model appears to be much more significantly impacted than the CNN model when it comes to worst case localization error.

From the study, it can be concluded that deep learning based indoor localization frameworks are highly vulnerable to WAP-based attacks. The exemplary system and method improve the attack resilience for these frameworks to achieve both robust and high accuracy indoor localization.

Experimental Setup. The study initially compared the accuracy and stability of the exemplary system (i.e., S-CNNLOC) to its vulnerable counterpart (CNNLOC [15])

using two benchmark paths. The paths are shown in FIG. 10 with each fingerprinted location (reference point) denoted by a marker. The paths were selected due to their salient features that may impact location accuracy in different ways. The 64-meter Office path is on the second floor of a relatively recently designed building with a heavy use of wood, plastics, and sheet metal as construction materials. The area is surrounded by small offices and has a total of 156 WAPs visible along the path. The Glover path is from a very old building with materials such as wood and concrete used for its construction. This 88-meter path has a total of 78 visible WAPs and is surrounded by a combination of labs (heavy metallic equipment) and classrooms with open areas (large concentration of users).

In the offline phase for S-CNNLOC, a user carried the HTC U11 smartphone and traversed the path with reference points at 1-meter intervals and captured 10 Wi-Fi scans at each reference point, storing the scanned values tagged with the corresponding reference point location data. The fingerprint sampling and storage methodology within the smartphone is similar to that described in CNNLOC [15]. The trained S-CNNLOC model was deployed as an Android app on the HTC U11 smartphone. The values of Q and M (discussed in Section 6) are set to 100 and 10 respectively. Based on these values of Q and M, the Office path has 64000 samples and the Glover path has 88000 samples. To study the impact of malicious WAPs on indoor localization performance, the study used a real Wi-Fi transceiver [40] to induce interference (from spoofing/jamming) and obtain "tainted" RSSI values in the vicinity of the indoor paths. These values were observed in the online phase. In some of the scalability evaluation, the study considered the impact of multiple malicious WAPs, multiple such transceivers were considered, to generate multiple "tainted" RSSI values.

Analysis of Noise Induction Aggressiveness. The study first performed a sensitivity analysis on the value of 0 (upper limit of noise induction; discussed in Section 6.2). Several CNN models were trained: S-CNNLOC1 (Ø=0; no malicious WAPs), S-CNNLOC2 (Ø=1), up to S-CNNLOC20 (Ø=20), using the fingerprint data collected during the offline phase. Then the devised models were tested with fingerprints observed along the indoor paths in the online phase, in the presence of different numbers of malicious WAPs.

Figure 13A:
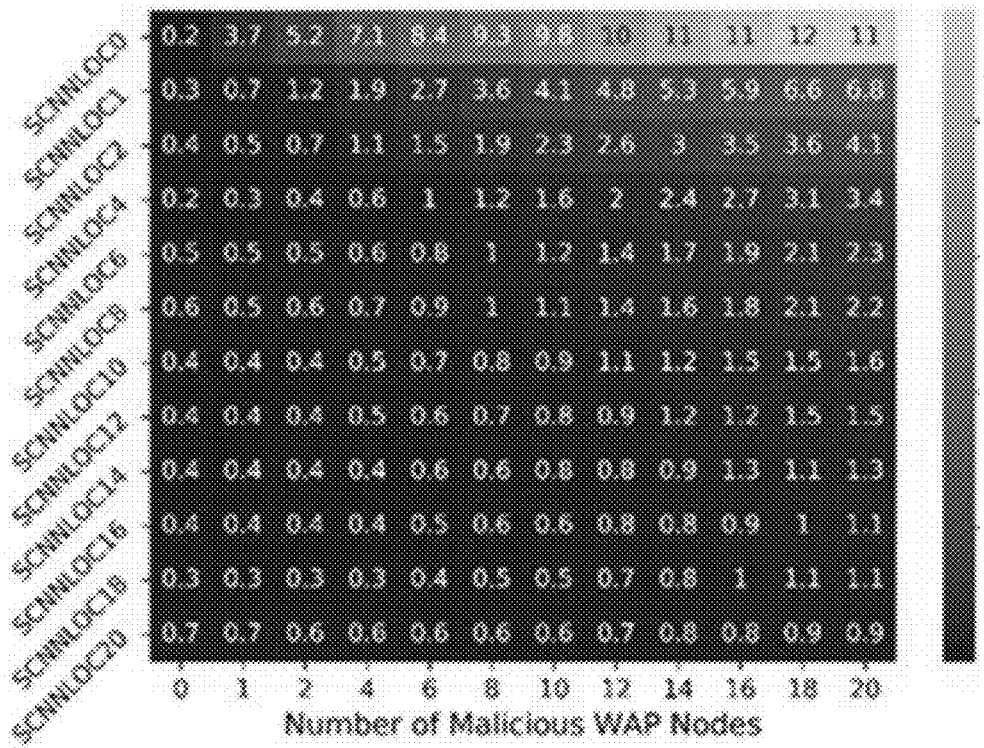
FIGS. 13A and 13B each shows experimental results of a heatmap for the mean localization errors of a secured convolutional neural network in accordance with an illustrative embodiment.
Figure 13B:
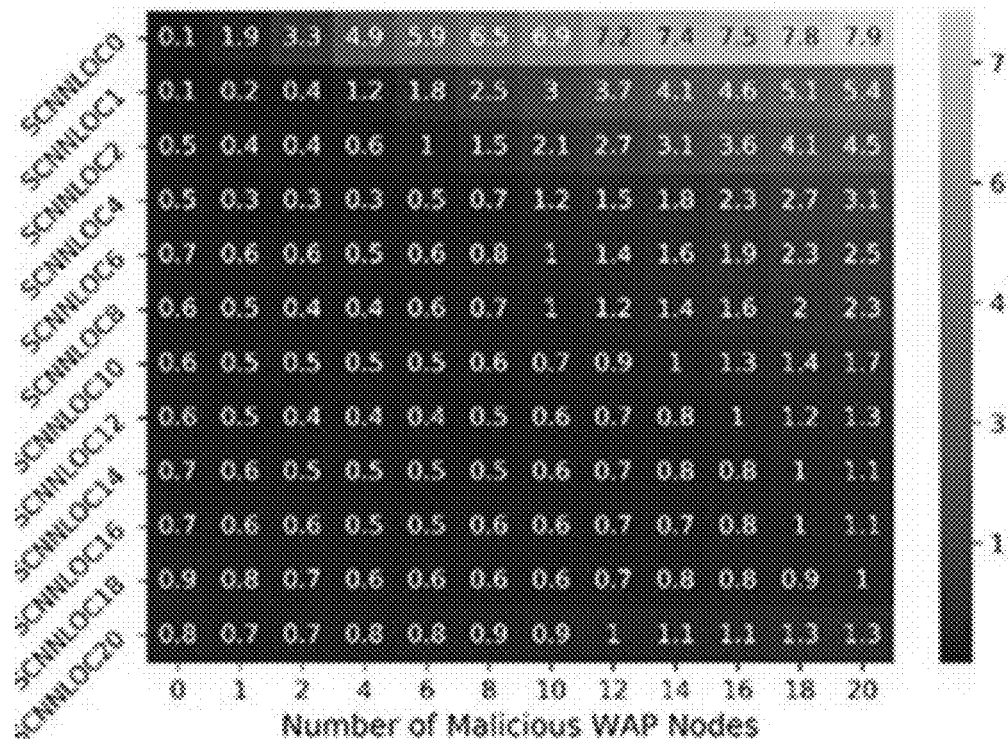

FIGS. 13A and 13B each shows the heatmap for the mean localization errors (in meters) of a secured convolutional neural network with annotated standard deviation of various scenarios on the Office path (FIG. 13A) and the Glover path (FIG. 13B). The y-axis shows various S-CNNLOC variants with different values of Ø varying from Ø=0, Ø=1, . . . Ø=20. The x-axis shows the number of malicious nodes (mWAPs) present in the online phase. The bright yellow cells of the heatmap, with higher annotated values, represent an unstable and degraded localization accuracy whereas the darker purple cells, with lower annotated values, represent stable and higher levels of localization accuracy. Each row of pixels in the heatmaps of FIG. 13A and FIG. 13B represents the vulnerability of the specific S-CNNLOC model to an increasing number of mWAP nodes.

In FIGS. 13A and 13B, it can be observed that the exemplary S-CNNLOC0 model is least resilient to an increasing number of mWAPs on both paths. However, as the value of Ø is increased for the S-CNNLOC models, the S-CNNLOC models are observed to perform significantly better than S-CNNLOC0 (as illustrated by the darker rows for these models). This is because the S-CNNLOC0 model is not trained to mitigate variations for WAP RSSI values.

Another observation is that beyond Ø=18, the standard deviation and mean error for low values of malicious WAPs (mWAPs<4) starts increasing for both paths. This may be due to highly noisy images in the SAAR database being unable to retain the original pattern required to localize in safer environments (no malicious WAPs) or the opted CNN-LOC model is unable to recognize underlying patterns in the input fingerprint images.

Overall, the study observed that training the S-CNNLOC models with fingerprint extrapolation and noise induction (via the generated SAAR database) leads to better localization accuracy. Indeed, S-CNNLOC18 delivered good results across both paths and is used for the subsequent analysis. Therefore, the study used the value of Ø=18 in SAAR to train S-CNNLOC.

Comparison of Attack Vulnerability.

The study contrasted the performance of the exemplary S-CNNLOC against a CNNLOC system as described in [15].

Figure 14A:
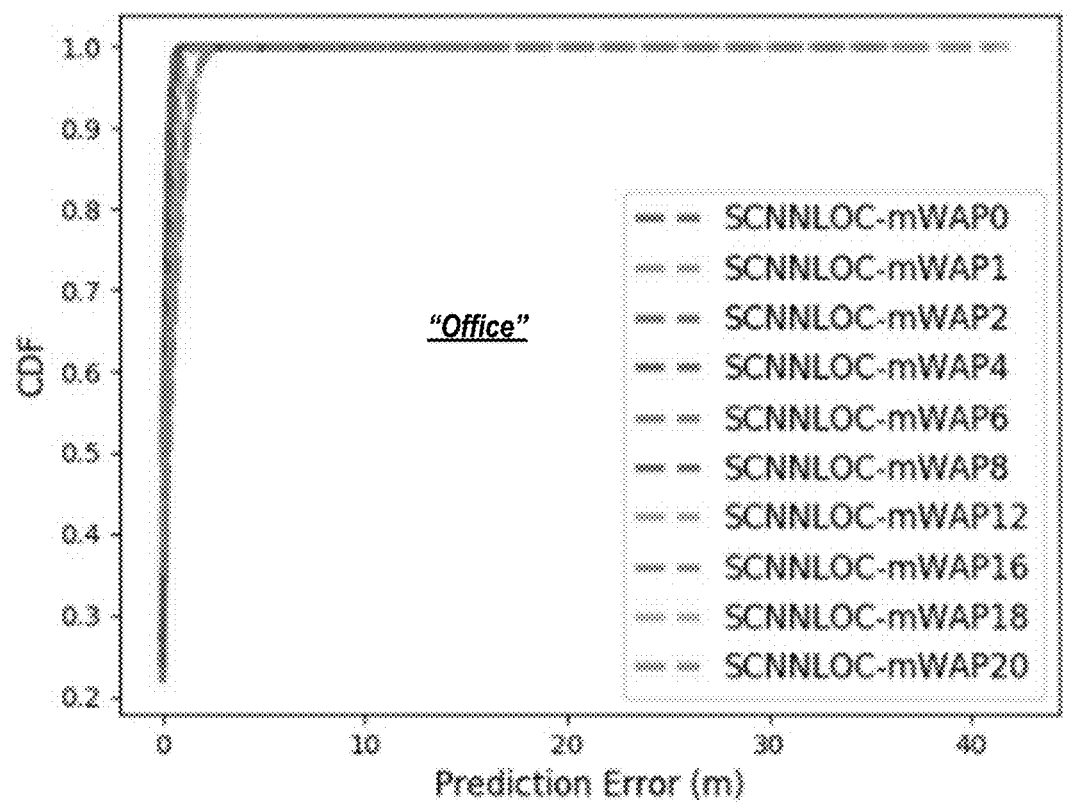
FIGS. 14A and 14B each shows experimental results from the study conducted at the locations of FIG. 10 of the impact of malicious WAPs on deep-learning model accuracy of a secured neural networks in accordance with an illustrative embodiment.
Figure 14B:
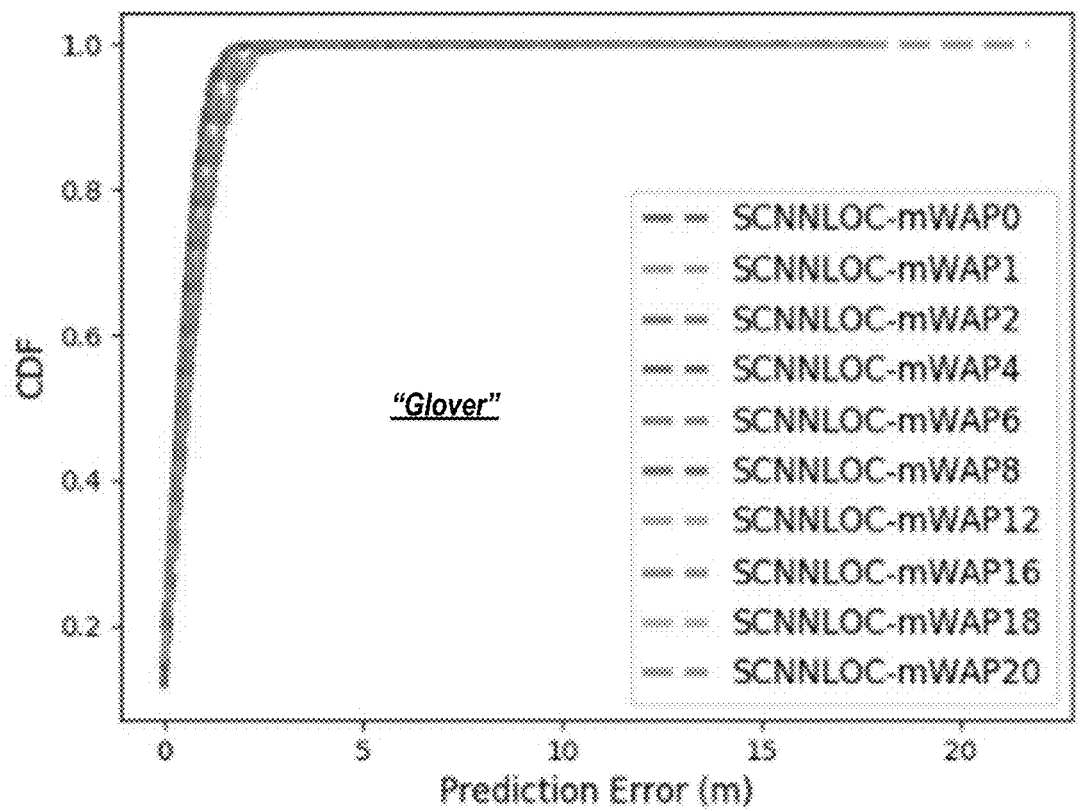
Figure 15A:
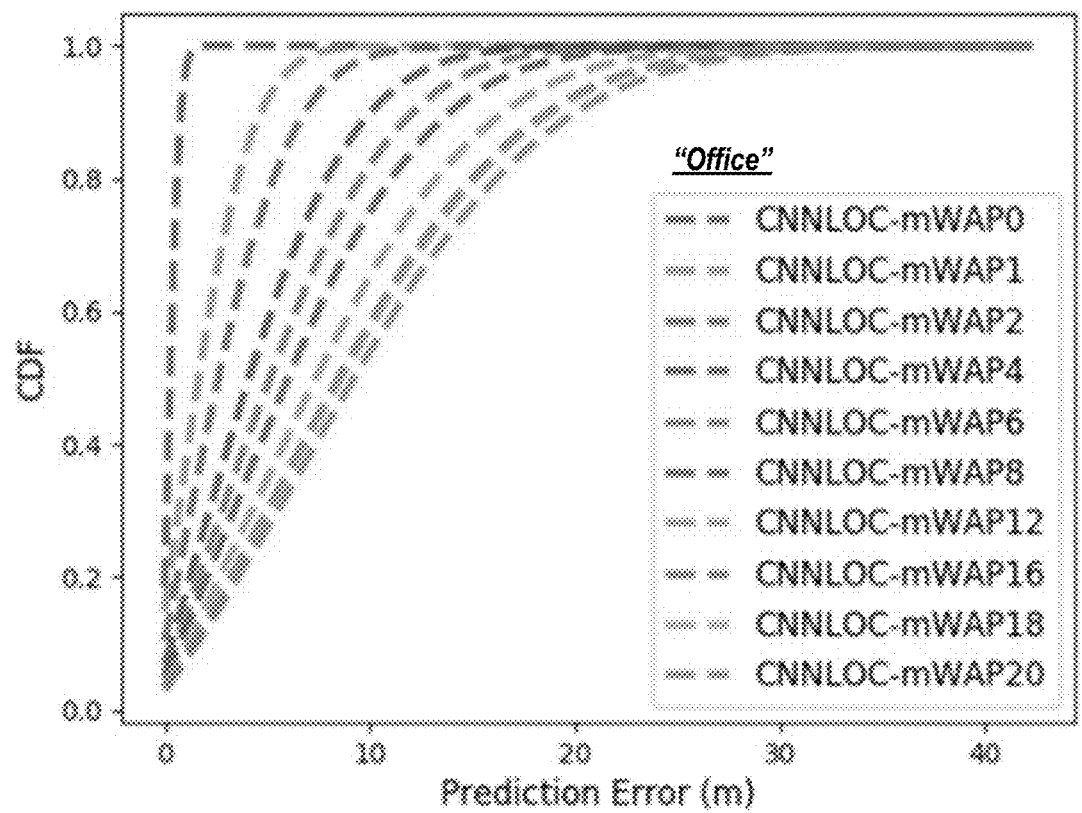
FIGS. 15A and 15B show localization prediction performance of an unsecured convolutional network used in a radio fingerprint-based indoor localization at a same varying number of malicious WAPs as FIGS. 14A and 14B as a comparison.
Figure 15B:
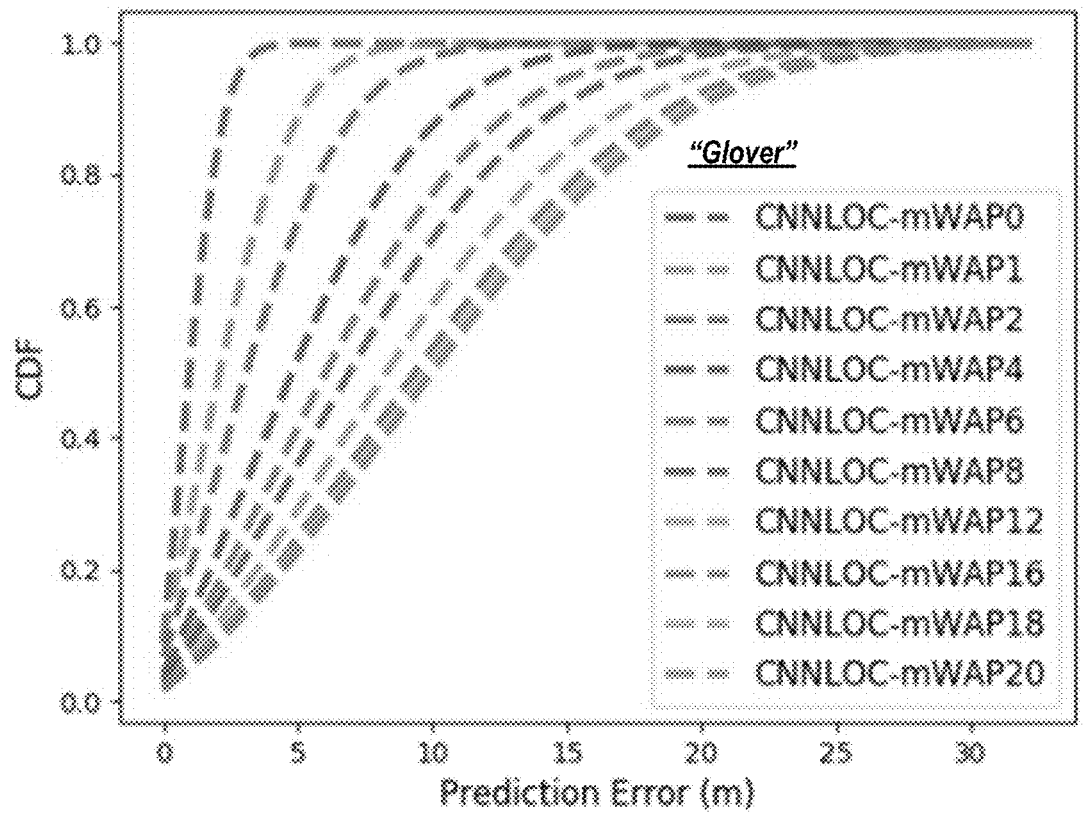
Figure 16A:
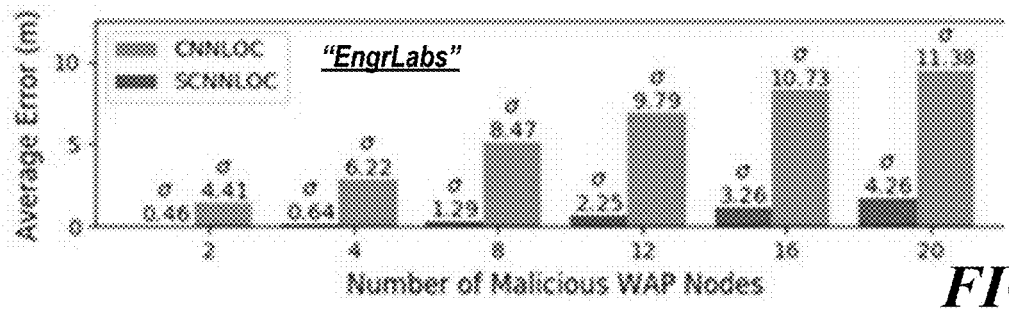
FIGS. 16A, 16B, 16C, 16D, and 16E each shows experimental results of a verification evaluation of the exemplary S-CNNLOC model at additional locations and a comparison of the performance of the exemplary S-CNNLOC to an unsecured CNNLOC for the same in accordance with an illustrative embodiment.
Figure 16B:
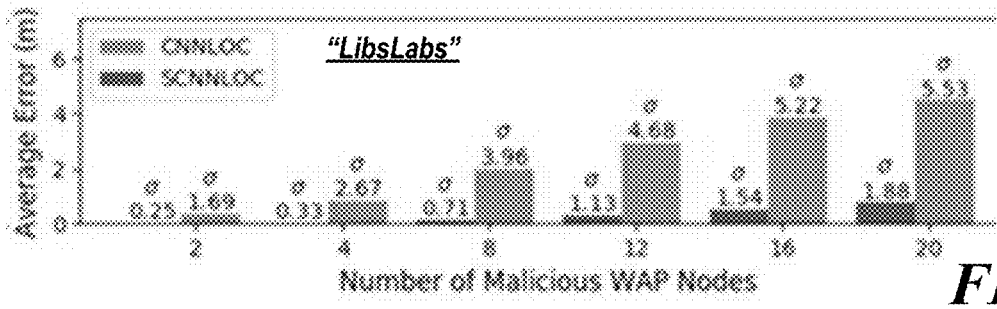
Figure 16C:
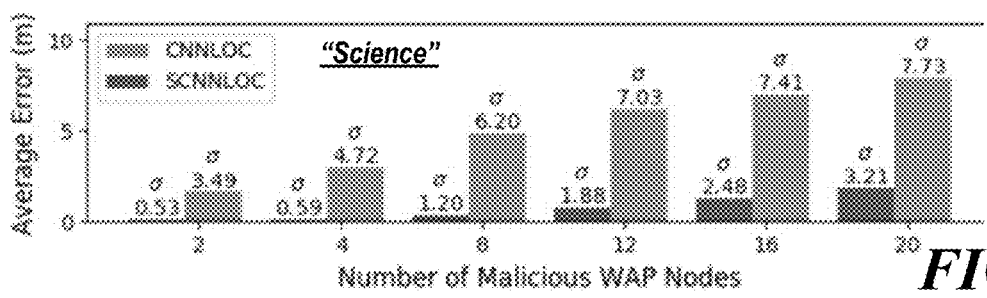
Figure 16D:
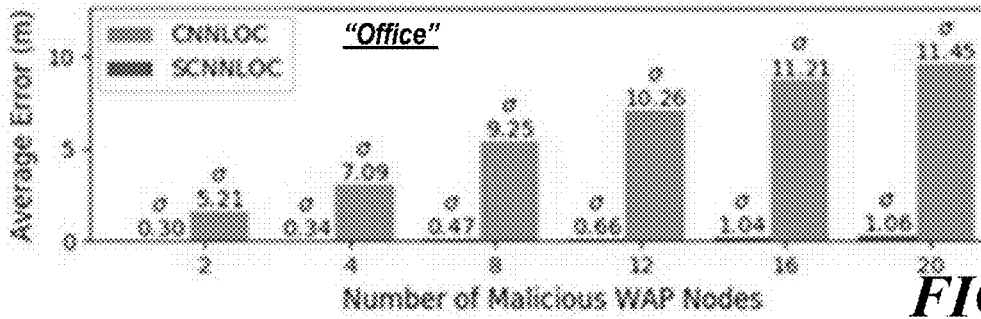
Figure 16E:
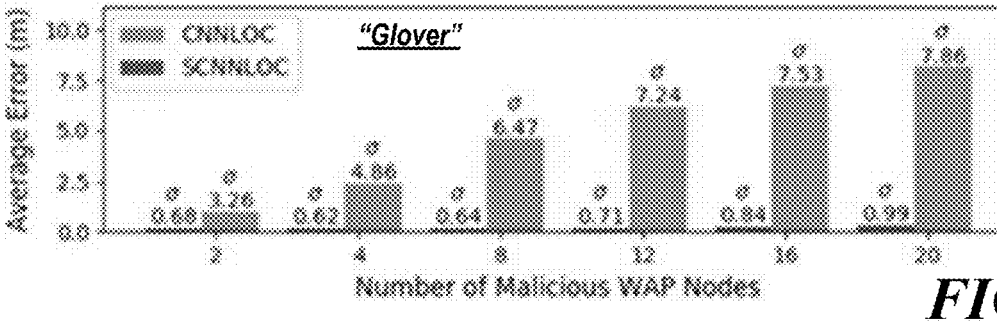

FIGS. 14A and 14B show localization prediction performance of a secured convolutional network (S-CNNLOC) used in a radio fingerprint-based indoor localization at varying number of malicious WAPs in accordance with an illustrative embodiment. FIGS. 15A and 15B show localization prediction performance of an unsecured convolutional network used in a radio fingerprint-based indoor localization at a same varying number of malicious WAPs as FIGS. 14A and 14B. Indeed, based on the results shown in FIGS. 14A, 14B, 15A, 15B, it can be observed that the exemplary S-CNNLOC is about 10 times more resilient to accuracy degradation in the average case, as compared to its unsecure counterpart CNNLOC [15], for the two tested environments.

Specifically, FIGS. 15A and 15B each show the cumulative distribution function (CDF) of the localization error for the CNNLOC models in the presence of different numbers of malicious WAPs (from 0 to 20 malicious WAPs per observed fingerprint), for the Office and Glover paths environments, respectively. FIGS. 15A and 15B show the same evaluation for the exemplary S-CNNLOC model and the performance of the exemplary S-CNNLOC model to malicious WAP based attacks.

In FIGS. 15A and 15B, it is observed that the localization errors are significantly low (less than 1 meter for a majority of scenarios) when there are no malicious WAPs (CNNLOC-mWAP0) but localization accuracy degrades as the number of malicious WAPs are increased. This degradation in accuracy does not appear to scale linearly with increasing malicious nodes. For example, in FIG. 15A (Office path data set), increasing the malicious AP nodes from 16 to 20 does not significantly increase the localization errors. A similar observation can be made from the Glover path data set in FIG. 15B in which it is observed that the localization error does not linearly increase when going from 12 malicious WAPs to 16 and 20.

As noted, FIGS. 15A and 15B each shows a significant drop in localization accuracy between the no malicious WAPs (CNNLOC-mWAP0) data set and the malicious WAP (CNNLOC-mWAP1) data set. The accuracy drop indicates the high vulnerability of unsecured CNN models to the presence of even a single malicious WAP node. Indeed, it is concluded that a malicious third party can significantly degrade the localization accuracy of a CNN-based indoor localization model such as CNNLOC [15], with just a very small number of malicious WAP nodes.

In contrast, FIGS. 14A and 14B, the performance for a secured convolutional neural network is shown for the same setup as for the experiment with CNNLOC in FIGS. 15A and 15B. In FIGS. 14A and 14B, it can be observed that 95-percentile of the localization error for the S-CNNLOC model, when under attack by up to 20 malicious WAP nodes (S-CNNLOC-mWAP20), remains under 2.5 meters for the Office path. Specifically, FIGS. 14A and 14B each shows an error of under 3.5 meters for each respective environment. The S-CNNLOC model for the Office path performs better than for the Glover path as the Wi-Fi density on the Office path is about 2× the Wi-Fi density of the Glover path, and thus malicious WAPs only impact a small fraction of the total WAPs along the Office path.

Extended Analysis on Additional Benchmark Paths.

The study further analysis on a more diverse set of benchmark indoor paths.

TABLE 1

| Path Name | Length (meter) | Number of WAPs | Environmental Features |
|---|---|---|---|
| EngrLabs | 62 | 120 | electronics, concrete, labs |
| LibStudy | 68 | 300 | wood, metal, open area |
| Sciences | 58 | 130 | metal, classrooms |
| Office | 64 | 156 | wood, concrete |
| Glover | 88 | 78 | wood, metal, concrete |

Table 1 shows salient features of the three new benchmark paths used in the analysis. Specifically, the analysis include analysis over three additional settings (EngrLabs, LibStudy and the Sciences paths). In Table 1, a description of environmental factors is shown that may affect the localization performance of Wi-Fi based indoor localization frameworks. Each path in the respective settings had a length ranging from 58 to 68 meters. Ten Wi-Fi fingerprint samples were collected at 1-meter intervals on each path. The first path (EngrLabs path) is located in an old building mostly made of concrete, which is surrounded by labs consisting of heavy metallic instruments. The second path (LibStudy and Sciences paths) are situated in relatively newer buildings consisting of large amounts of metallic structures. The second path (LibStudy path) was in the library, which is a relatively open area and is usually heavily populated at most times. The third path (Sciences Path®) is surrounded by large classrooms.

FIGS. 16A-16E each shows the means and standard deviations of the localization error with the exemplary S-CNNLOC (Ø=18) and the CNNLOC [15] framework on each of the three paths while it is under the influence of 2 to 20 malicious WAPs in the online phase. It can be observed that there is increasing trend in mean and standard deviations of localization errors on all three paths for both S-CNNLOC and CNNLOC. However, it is also observed that the mean localization error of CNNLOC on all three paths is always more than 4 times the average error for S-CNNLOC. For some situations, such as for 2 and 4 malicious WAPs on the EngrLabs and Sciences paths (FIGS. 16A and 16C, respectively), the localization error for CNNLOC is about 25 times higher (worse) on average as compared to its S-CNNLOC counterpart. The accuracy along the Libstudy path (FIG. 16B) is relatively less affected than for the other paths. It may be that the Lib Study path (FIG. 16B) has an unusually dense Wi-Fi network compared to the EngrLabs (FIG. 16A) and Sciences paths (FIG. 16C), and thus a relatively fewer number of malicious WAPs do not have as much of an impact on accuracy. The study indicates that the exemplary S-CNNLOC can scale over a wide variety of indoor paths with different environmental features whereas the unsecured CNNLOC [15] framework experiences a significant degradation in its localization error. The S-CNNLOC model consistently reduces the vulnerability of the proposed localization framework and thus represents a promising solution to secure deep learning-based indoor localization frameworks.

Generality of Exemplary System and Method and Additional Examples

Denoising Autoencoder Based DNN Framework.

The exemplary method can be generalized to various deep learning-based fingerprint-based indoor localization applications. An example is provided for a DNNLOC described in [17].

The DNN-based approach in [17] includes three stages in the online phase. In the first stage, features are extracted from the RSSI fingerprints using a Stacked Denoising Autoencoder (SDA). The SDA's output is fed to a four-layer DNN model in the second stage that delivers a coarse location prediction. In the final stage, additional Hidden Markov Model (HMM) is used to finetune the coarse localization perdition received from the DNN model.

Figure 13C:
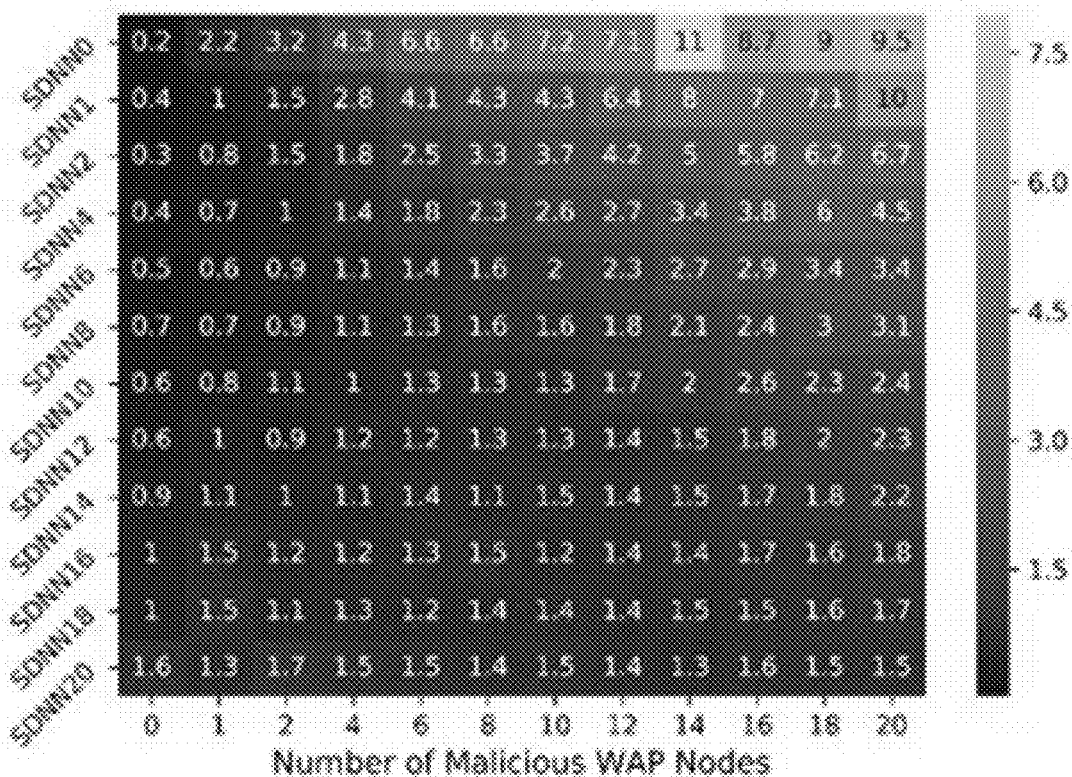
FIGS. 13C and 13D each shows experimental results of a heatmap for the mean localization errors of a secured deep neural network in accordance with an illustrative embodiment.
Figure 13D:
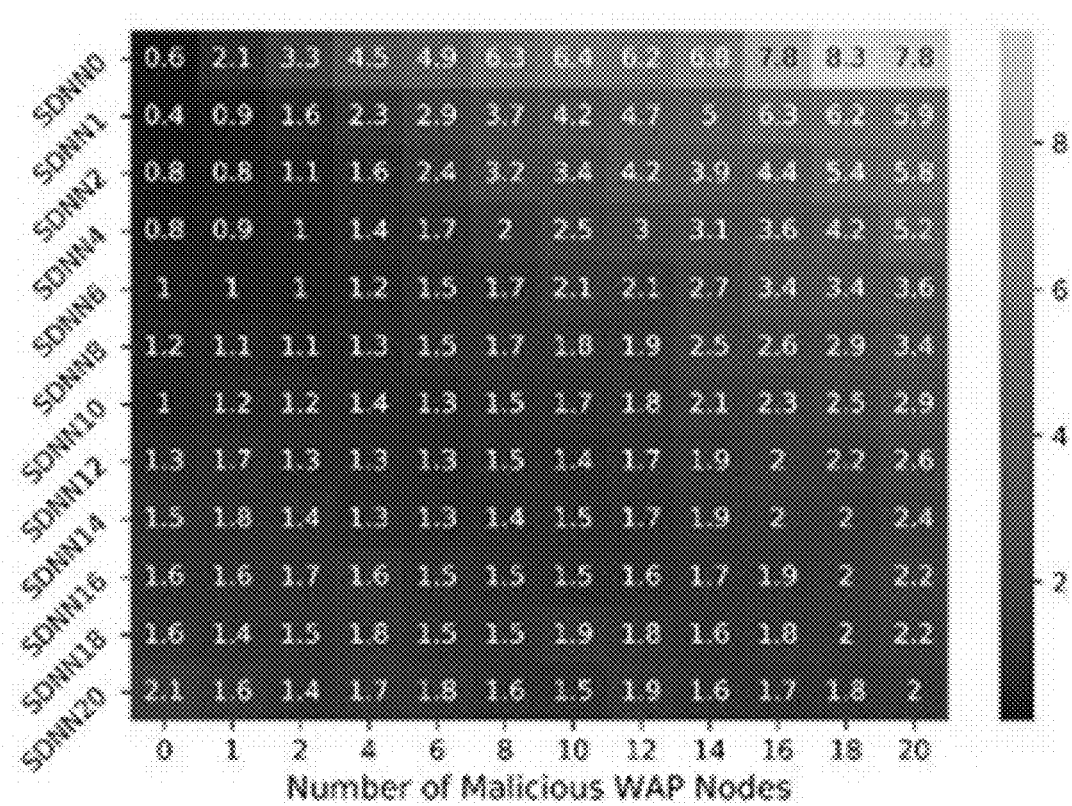

FIGS. 13C and 13D each shows experimental results of a heatmap for the mean localization errors of a secured deep neural network in accordance with an illustrative embodiment. Further description of the DNN evaluation is provided in U.S. Provisional Patent application No. 62/902,779, which is incorporated by reference in its entirety.

Indeed, a notable aspect of the exemplary system and method is the ability to ignore malicious WAPs in the testing phase. The extent of resilience to the malicious WAP-based attacks may be dependent on the deep learning model's ability to identify underlying pattern in the training fingerprints. Deep learning models such as CNNs and SDA-based approaches are more likely to deliver commercially viable systems as they are both designed to identify underlying stable patterns in the training phase.

Discussion

In the early 1980's, the unintended deviation of a commercial airliner from its designated path due to unreliable navigation equipment led to 269 casualties [1]. This prompted U.S. authorities to recognize the need for a reliable global localization solution. As a result, the Global Positioning System (GPS) being built for the U.S military, when completed, was promised to be available for public use. In the subsequent decade, GPS technology was completely commercialized [2]. These historic events reformed the global transportation industry and allowed vehicles to not only localize themselves but also to navigate reliably. To further enhance security of GPS based services, recent works have started to focus on the modeling and characterization of GPS spoofing [42] and time reliability-based attacks [43] and further propose the utilization of crowdsourcing methodologies to detect and localize spoofing attacks [44]. Regardless of such advances the recent history of attacks on GPS for outdoor navigation [3], [4] motivates stronger security features. On the other hand, indoor localization is an emerging technology with a similar purpose and is poised to reinvent the way people can navigate within buildings and subterranean locales. However, limited attention has been made towards securing indoor localization and navigation frameworks against malicious attacks and ensuring that the future indoor localization frameworks are reliable.

Almost two decades of research has contributed to the evolution of the indoor localization and navigation domain.

Several commercial solutions and standards are being established today to enable indoor localization in the public sector. For example, recently a new standard for Wi-Fi was established in collaboration with Google that would allow anyone to set up their own localization system by sharing their indoor floor map and the Wi-Fi router positions on that map with Google [5]. Nowadays, companies such as Amazon and Target are also starting to track customers at their stores [6]. With an increasing number of startups in the area of indoor localization services security concerns pertaining to the commercialization of such technology are almost never discussed.

The emergence of the commercialization of indoor localization technology can be attributed to its usefulness for a wide variety of non-critical and critical applications. For example, depending on the context of the situation [45], navigating students to the correct classroom may represent non-critical applications, where some factor of unreliability would not lead to any serious repercussions. However, there are some applications in a time-critical response context and need an enhanced level of reliability and security. Such scenarios include navigating medical staff and equipment closest to a patient in the correct room at a hospital in real-time or notifying emergency responders to the location of a person in case of a serious health hazard such as a heart attack, collapse, or fire.

Unfortunately, malicious third parties can exploit the vulnerabilities of unsecured indoor localization components (e.g., Wi-Fi Access Points or WAPs) to produce incorrect localization information [7], [8]. This may lead to some inconvenience in non-critical contexts (e.g., a student arrives at the wrong classroom), but can lead to dire consequences in more critical contexts (e.g., medical staff are unable to locate vital equipment or medicine needed for a patient in an emergency; or emergency response personnel are misdirected, causing a loss of lives). Tainted information from intentional or unintentional sources can lead to even more egregious real-time delays and errors. Therefore, similar to outdoor navigation systems, establishing secure and reliable indoor localization and navigation systems holds an uncontested importance in this domain.

Despite much research on indoor localization solutions, the security and reliability concerns of the proposed indoor localization frameworks are often overlooked. The vulnerabilities and associated security methodologies that can be applied to an indoor localization framework are often tailored to the localization method used and a generalized security and reliability framework is not available.

For the purpose of indoor localization, at one end of the spectrum are triangulation/trilateration-based methods that either use geometric properties such as the distance between multiple APs and the receiver/smartphone, [6], [9], [10] (trilateration) or the angles at which signals from two or more APs are received [8], [11] (triangulation). Such techniques are often prone to Radio Frequency (RF) interference and malicious node-based attacks. Some work has been done to overcome these vulnerabilities through online evaluation of signals and packets [12]. However, these indoor localization frameworks are inherently not resilient to multipath effects, where the RF signal reaches a destination after being reflected across different surfaces, and shadowing effects, where the RF signal fades due to obstacles. Some recent work has investigated multipath effects for triangulation [13], but these works do not apply to commodity smartphones (expected to be the de-facto portable device for indoor localization) and hence, have limited applicability.

On the other end of the spectrum are fingerprinting based methods that associate selected indoor locations (reference points) with a unique RSSI (Received Signal Strength Indicator) signature obtained from APs accessible at that location [14], [15] (fingerprinting is discussed in more detail in section 2). These techniques have proven to be relatively resilient to multi-path reflections and shadowing, as the reference point fingerprint captures the characteristics of these effects, leading to improved indoor localization. However, fingerprinting requires a more elaborate offline-phase (i.e., setup) than triangulation/trilateration methods, where RSSI fingerprints need to be captured across indoor locations of interest and stored in a fingerprint database, before being able to support localization or navigation (by referring to the database) in the online-phase, in real-time.

Fingerprinting-based techniques are not only vulnerable to interference and malicious node-based attacks but are also prone to database corruption and privacy/trust issues (discussed in the next section). Amongst the mentioned vulnerabilities, RSSI interference and malicious node or AP attacks are significantly easier to perform as they only require the attacker to gain physical access into the indoor location where the attack needs to take place. Once the attacker is at the site, they could, for instance, deploy battery powered AP units that would either interfere with the localization AP signals or spoof valid AP nodes. Moreover, a single malicious AP unit is capable of spoofing multiple packets for multiple valid APs in the area.

Figure 17:
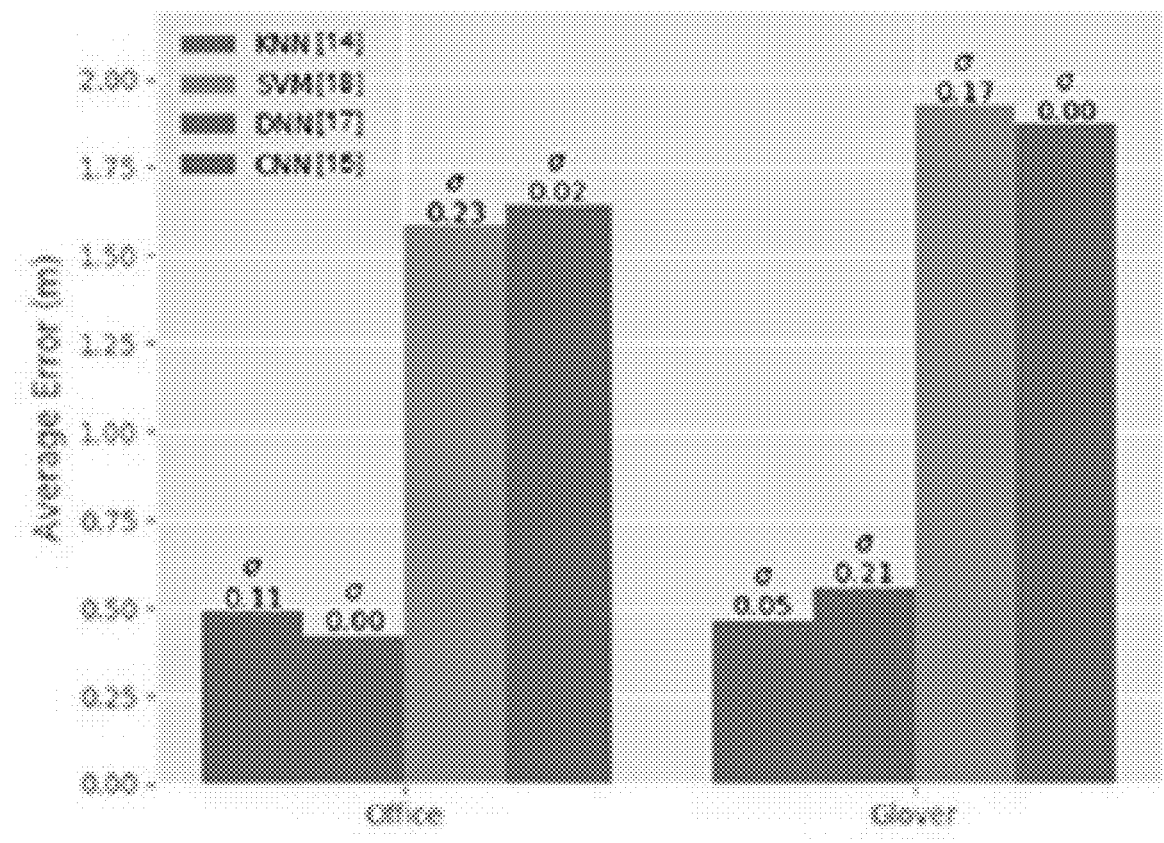
FIG. 17 shows an average indoor localization error (in meters) in a discussion of fingerprinting techniques based on deep neural networks (DNNs), convolutional neural networks (CNNs), support vector machines (SVM), and k-nearest-neighbor (KNN).

FIG. 17 shows an average indoor localization error (in meters) for fingerprinting techniques based on deep neural networks (DNNs), convolutional neural networks (CNNs), support vector machines (SVM), and k-nearest-neighbor (KNN). Results are shown for two different indoor paths.

Simple fingerprinting-based indoor localization frameworks that use techniques such as KNN (k-nearest-neighbor) can utilize outlier detection-based techniques to overcome some security issues [16]. However, recent work on improving Wi-Fi fingerprinting accuracy has tended to exploit the increasing computational capabilities of smartphones and utilize more powerful machine learning techniques. For instance, sophisticated convolutional neural networks (CNNs) [15] have been evaluated and shown to improve fingerprint-based indoor localization accuracy on smartphones. FIG. 17 shows the improvements when using CNN and deep neural network (DNN) [17] based localization approaches as compared to more traditional techniques such as KNN [14] and support vector machines (SVM) [18]. Based on the improvements achieved through CNN- and DNN-based algorithms, indoor localization solutions in the future are expected to benefit from the use of deep learning methodologies that have the potential to significantly reduce localization errors. However, to date, no studies have been performed to assess the impact on accuracy for malicious AP attacks on deep learning based indoor localization.

Indeed, a vulnerability analysis is disclosed of deep learning based indoor localization frameworks that are deployed on mobile devices, in the presence of wireless access point (WAP) spoofing and jamming attacks. The analysis highlighted the significant degradation in localization accuracy that can be induced by an attacker with very minimal effort. The conducted study suggest that an unsecured convolutional neural network (CNN) based indoor localization solution can place a user up to 50 meters away from their actual location, with attacks on only a few WAPs. The exemplary system and method provide resilience against such attacks, e.g., in a CNN-based localization framework to address its vulnerability to intentional RSSI variation-based attacks. In addition, the study showed that the exemplary system and method may be applied in other security aware approach, e.g., in a Deep Neural Network (DNN) based indoor localization system.

The exemplary system and method may be used to predict the path taken by a user using multiple Wi-Fi fingerprints as an attack is taking place, e.g., to correct a previous prediction (path taken) based on the upcoming predictions and vice versa. In such embodiments, the exemplary system and method may improve the localization accuracy and stability in corner cases in the online phase where fingerprints at a location are similar in structure to others fingerprint that are spatially separated by large distances.

Problem Formulation.

The exemplary method may be applied to other deep learning systems using problem objective and applicable assumptions, including (i) the offline fingerprint sampling process is carried out in a secure manner such that the collected fingerprints only consist of trusted non-malicious WAPs; (ii) the offline generated fingerprint database is comprised of images, each with a tagged reference point location; this database is stored at a secure, undisclosed location; (iii) a CNN model is trained using the offline fingerprint database and is encrypted and packaged as a part of an indoor localization app that is deployed on mobile devices; (iv) once the localization app is installed by a user, the CNN model can only be accessed by that app; (v) as the user moves about an indoor path, their mobile device conducts periodic Wi-Fi scans; and the localization app translates the captured Wi-Fi RSSI information into an image; (vi) the generated image is fed to the CNN model within the localization app on the mobile device, and the user's location is updated in real-time on a map displayed on the device; and (vii) the process of Wi-Fi scanning, fingerprint to image conversion, and location prediction continues until the user quits the localization app on their mobile device.

The following assumptions about the indoor environment may also be made. First, an attacker can physically access one or more of the indoor locales and paths in the online phase for which the indoor localization framework has been trained and set-up. Second, the attacker can carry a smartphone equipped with Wi-Fi or any other portable battery powered Wi-Fi transceiver to capture data about Wi-Fi access points (WAPs). Third, the offline generated fingerprint database is secured and cannot be accessed by any malicious third party. Fourth, it is generally known (to the attacker) that the indoor localization framework utilizes a deep learning-based approach, such as CNNs, to predict a user's location. Fifth, the attacker is capable of conducting the analysis described in the previous section and place malicious WAP nodes at any randomly chosen locations along the indoor paths or locales that are being targeted for a service disruption attack. Sixth, the attacker can walk about an indoor path and collect Wi-Fi fingerprints while capturing steps taken and walking direction data, similar to the approach described in [37]; this would allow anyone with a smartphone to create their own fingerprint database which can be used to more strategically place Wi-Fi jammers or spoofed WAPs as discussed in earlier sections.

Problem Objective:

Given the above assumptions, the objective may be to create a secure CNN-based indoor localization framework (called S-CNNLOC) that is deployed on mobile devices and is resilient to malicious WAP RSSI attacks, by minimizing their impact on the localization accuracy at run-time (i.e., in the online phase).

FIG. 18 illustrates an example radio signal propagation effect in a discussion of radio fingerprint-based indoor localization application and a process to perform the offline training of the exemplary S-CNNLOC in accordance with an illustrative embodiment.

FIG. 19 illustrates an example radio signal propagation effect in a discussion of radio fingerprint-based indoor localization application and a process to perform the online operation of the exemplary S-CNNLOC in accordance with an illustrative embodiment.

Specifically, FIGS. 18 and 19 illustrates an example effects of a radio signal traveling from its source (WAP2) towards location (L2). In FIGS. 18 and 19, the signals transmitted from WAP2 get scattered at the edges of the pillar, reflect off walls, and get attenuated as they pass through the pillar to reach the reference point "L2". Also, the signals from WAP2 follow different paths (called multipath traversal) to reach location "L2". These effects lead to an RSSI reading at "L2" that does not correspond to Equation 6 which was designed to function in free space.

Fingerprint-Based Indoor Localization.

Since the first efforts on finger-printing-based indoor localization about two decades ago, such as with the work in RADAR [19], a significant level of advancement has been achieved in field of fingerprint-based indoor localization. However, the general premise of fingerprinting based indoor localization has remained unchanged. As shown in FIGS. 18 and 19, fingerprinting-based localization is carried out in two phases.

In the first phase (called the offline or training phase) (FIG. 18), the RSSI values for visible Wi-Fi APs (WAPs) are collected for a given floorplan at reference points L1, L2, L3 etc. identified by some coordinate system. The RSSI fingerprint captured at a given reference point consists of RSSI values (in dBm) for the WAPs in the vicinity and the X-Y coordinate of the reference point. The resulting database of location-tagged RSSI fingerprints (FIG. 18) is then used to train models (e.g., machine learning-based) for location estimation such that the RSSI values are the input features and the reference point location coordinates are the target (output) features. The trained machine learning model is then deployed to a mobile device as shown in the offline phase of FIG. 18.

In the second phase (called online or testing phase) (FIG. 19), the devices are used to predict the (X-Y coordinate) location of the user carrying the device, based on real-time readings of WAP RSSI values on the device. Contrary to the supervised learning approach discussed so far, some recent work also explores adapting semi-supervised deep reinforcement learning to deliver improved accuracy when very limited fingerprinting data is available in the training phase [41]. One of the advantages of using finger-printing-based techniques over other methods (e.g., trilateration/trilateration) is that knowledge of environmental factors such as multipath signal effects and RF shadowing are captured within the fingerprint database (such as for the reference point "L2" in FIGS. 18 and 19) in the offline phase and thus leads to improved localization accuracy in the online phase, compared to other methods.

An aspect of fingerprinting-based indoor localization is the choice of the signal-source utilized. Some commonly used signal-source options include Ultra-Wide-Band (UWB) [20], Bluetooth [21], ZigBee [22], and Wi-Fi [14]. The choice of signal directly impacts the achievable localization accuracy as well as the associated setup and maintenance costs. For example, UWB APs may need to be specially purchased and deployed at the target site, however, they have been shown to deliver a higher level of accuracy than many other signal types. Wi-Fi based indoor localization frameworks have gained traction due to the ubiquitous availability of Wi-Fi access point (WAPs) in indoor locales and are nowadays available via smartphones that are equipped with Wi-Fi transceivers, making WAP-based indoor localization a cost-effective and popular choice [14], [15].

Challenges with Indoor Localization.

As a result of the popularity of Wi-Fi fingerprinting, efforts in recent years have been made to overcome its limitations, such as energy-efficiency [14], variations due to device heterogeneity [23], and temporal degradation effects on localization accuracy [24]. However, in recent years as indoor localization services are beginning to be prototyped and deployed, researchers have raised concerns about the privacy, security, and other vulnerabilities associated with fingerprinting-based localization. Some commonly identified vulnerabilities and their mitigation strategies are discussed in the rest of this section.

Offline-Phase Database Security:

The indoor localization fingerprint database consists of three pieces of information in each entry of the database: WAP Media Access Control (MAC) addresses, RSSI values of these WAPs, and the associated reference point location tag (e.g., XY co-ordinate of a location). A malicious third-party, may corrupt the database by changing the RSSI values associated with the MAC addresses or change the location where the samples were taken. This kind of an attack can completely jeopardize the functionality of an indoor localization framework, as the offline database holds the most crucial information required for any fingerprinting-based indoor localization framework to function. To mitigate such issues, researchers have proposed techniques such as outlier detection-based identification of corrupted information [7], [8] and performing continuous sanity checks on the database using checksums [25]. Alternatively, even if the attackers are able to read the database, they can use the information such as reference point locations and WAP MAC addresses to launch other forms of attacks, as discussed next.

User Location Privacy:

Some recently proposed indoor localization techniques exploit resource intensive machine learning models that need to be executed on the cloud or some other form of remote service, instead of the user's mobile device. These frameworks may compromise the user's privacy by either intentionally or unintentionally sharing the user's location with a third party. The leaked location and background information from one user can then be correlated to other users for their information [26]. However, recent advances have been able to optimize the execution of complex machine learning models on resource constrained mobile devices such that the location prediction computation does not need to be offloaded to the cloud or other types of remote services [15].

AP Jamming or Interference:

An attacker may deteriorate the quality of localization accuracy in a specific region indoors by placing signal jammers (narrow band interference) in the vicinity [28], [29]. The jammer can achieve this goal by emitting Wi-Fi signals to fill a wireless channel, thereby producing signal interference with any non-malicious WAPs on that channel. Alternatively, the jammer can also continuously emit Wi-Fi signals on a channel such that legitimate WAPs never sense the channel to be idle and therefore do not transmit any information [30]. Such an attack may cause a mobile device to lose visibility of WAPs, reducing localization accuracy or preventing localization from taking place altogether.

Malicious AP Nodes or Spoofing:

In this mode of attack, a malicious third-party places one or more transmitters at the target location to spoof the MAC address of valid WAPs used by the fingerprinting-based localization framework. The MAC address could have been obtained by a person capturing Wi-Fi information while moving in the target area. Alternatively, this information could have been leaked through a compromised fingerprint database. Also, the behavior of the malicious nodes in each case may change over time. The detection of spoofing-based attacks is also an active area of research in the robot localization domain. Approaches proposed include the empirical analysis of data collected at a post-localization phase [47] and using machine learning [48]. However, both works solely focus on detecting a spoofing attack either in real-time or offline. Techniques such as the one presented in [32] allow for the identification of malicious nodes using linear regression on data collected over a certain period of observation time. However, any delay in the mitigation of WAP-based attacks in real-time would leave the indoor localization framework vulnerable and may lead to tainted predictions, thereby disrupting the localization services or giving the attacker a window of opportunity.

Environmental Alterations:

Changes or alterations in the indoor environment can induce unpredictable changes to the WAP-based fingerprints in the online phase. Such alterations could include moving furniture or machinery, or renovations in the building. Crowdsourcing-based techniques, e.g., [27], that update fingerprints on-the-fly may be more resilient to such effects, given that ample number of (crowd-sourced) fingerprint samples are collected in the area where the changes took place. However, deep-learning based techniques may need to be retrained to accommodate for the changes, which may take several hours and thus be impractical for real-time adaptation.

Indeed, attacks such as jamming and spoofing are relatively easy to conduct when the attacker is able to access an indoor location. With recent interest in deep learning-based fingerprinting to improve indoor localization accuracy [15], [17], [41], there is a critical need to analyze and address security vulnerabilities for such solutions. However, to date, the inventor understands that no prior work has explored the impact of malicious AP-based attacks on the accuracy and reliability of deep learning based indoor localization frameworks. The exemplary system and method address vulnerabilities deep learning-based indoor localization such as CNNLOC [15] to malicious AP-based attacks and make them resilient to loss in localization accuracy, preferably on commodity mobile devices.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; the number or type of embodiments described in the specification.

The term "about," as used herein, means approximately, in the region of, roughly, or around. When the term "about"

is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5).

Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications and publications as listed below and throughout this document are hereby incorporated by reference in their entirety herein.

[1] Laskow, "The Plane Crash That Gave Americans GPS", the Atlantic (2019).
[2] Sullivan, "A brief history of GPS", PCWorld (2019).
[3] Brewster, "This GPS Spoofing Hack Can Really Mess with Your Google Maps Trips", Forbes (2019).
[4] Jones, "Spoofing in the Black Sea: What really happened?", GPS World (2019).
[5] "Wi-Fi RTT (IEEE 802.11mc)", 2019 [online]. Available: https://www.source.android.com/devices/tech/connect/wifi-rtt.
[6] Anonymous, "Top 33 indoor localization services in the US", TechNavio (Blog) (2019).
[7] Y. Chen, W. Sun, and J. Juang, "Outlier detection technique for RSS-based localization problems in wireless sensor networks" SICE, 2010.
[8] A. Khalajmehrabadi, N. Gatsis, D. J. Pack and D. Akopian, "A Joint Indoor WLAN Localization and Outlier Detection Scheme Using LAS-SO and Elastic-Net Optimization Techniques," in IEEE Transactions on Mobile Computing, vol. 16, no. 8, pp. 2079-2092, 2017.
[9] J. Schmitz, M. Hernandez and R. Mathar, "Real-time in-door localization with TDOA and distributed software de-fined radio: demonstration abstract," Information Processing in Sensor Networks (IPSN), 2016.
[10] D. Vasisht, S. Kumar, and D. Katabi, "Sub-Nanosecond Time of Flight on Commercial Wi-Fi Cards," Special Interest Group on Data Communication (SIGCOMM), 2015.
[11] Z. Chen, Z. Li, X. Zhang, G. Zhu, Y. Xu, J. Xiong and X. Wang, "AWL: Turning Spatial Aliasing From Foe to Friend for Accurate WiFi Localization," Conference on emerging Networking Experiments and Technologies (CoNEXT), 2017.
[12] Z. Lu, W. Wang and C. Wang, "Modeling, Evaluation and Detection of Jamming Attacks in Time-Critical Wireless Applications," in IEEE Transactions on Mobile Computing, vol. 13, no. 8, pp. 1746-1759, 2014.
[13] E. Soltanaghaei, A. Kalyanaraman and K. Whitehouse, "Multipath Tri-angulation: Decimeter-level Wi-Fi Localization and Orientation with a Single Unaided Receiver," Mobile Systems, Applications, and Services (MobiSys), 2018.
[14] S. Pasricha, V. Ugave, C. W. Anderson and Q. Han, "LearnLoc: A framework for smart indoor localization with embedded mobile devices," Hardware/Software Codesign and System Synthesis (CODES+ISSS), 2015.
[15] A. Mittal, S. Tiku, and S. Pasricha, "Adapting Convolutional Neural Networks for Indoor Localization with Smart Mobile Devices," Great Lakes Symposium on VLSI (GLSVLSI), 2018.
[16] W. Meng, W. Xiao, W. Ni and L. Xie, "Secure and robust Wi-Fi finger-printing indoor localization," Indoor Positioning and Indoor Navigation (IPIN), 2011.
[17] W. Zhang et al., "Deep Neural Networks for wireless localization in indoor and outdoor environments," Neurocomputing, vol. 194, pp. 279-287, 2016.
[18] Y. K. Cheng, H. J. Chou and R. Y. Chang, "Machine-Learning Indoor Localization with Access Point Selection and Signal Strength Reconstruction", Vehicular Technology Conference (VTC), 2016.
[19] P. Bahl, and V. Padmanabhan, "RADAR: An in-building RF-based user location and tracking system," INFOCOM, 2000.
[20] "Ubisense Research Network", 2017 [Online] Available: http://www.ubisense.net/.
[21] P. Dickinson, G. Cielniak, O. Szymanezyk and M. Mannion, "Indoor positioning of shoppers using a network of Bluetooth Low Energy beacons," Indoor Positioning and Indoor Navigation (IPIN), 2016.
[22] S. Lau, T. Lin, T. Huang, I. Ng, and P. Huang, "A measurement study of zigbee-based indoor localization systems under RF interference," Workshop on Experimental evaluation and Characterization (WIN-TECH), 2009.
[23] H. Zou, et al., "A Robust Indoor Positioning System Based on the Procrustes Analysis and Weighted Extreme Learning Machine," in IEEE Transactions on Wireless Computing, vol. 15, no. 2, pp. 1252-1266, 2016.
[24] L. Chang, X. Chen, J. Wang, D. Fang, C. Liu, Z. Tang, and W. Nie, "TaLc: Time Adaptive Indoor Localization with Little Cost", MobiCom Workshop on Challenged Networks (CHANTS), 2015.
[25] D. Barbará, R. Goel, and S. Jajodia, "Using checksums to detect data corruption," International Conference on Extending Database Technology, 2000.
[26] L. Ou, Z. Qin, Y. Liu, H. Yin, Y. Hu and H. Chen, "Multi-User Location Correlation Protection with Differential Privacy," International Conference on Parallel and Distributed Systems (ICPADS), 2016.
[27] C. Wu, Z. Yang and Y. Liu, "Smartphones Based Crowdsourcing for Indoor Localization," in IEEE Transactions on Mobile Computing, vol. 14, no. 2, pp. 444-457, 2015.
[28] L. Lazos and M. Krunz, "Selective jamming/dropping insider attacks in wireless mesh networks," in IEEE Transactions on Networks, vol. 25, no. 1, pp. 30-34, 2011.
[29] Z. Lu, W. Wang and C. Wang, "Modeling, Evaluation and Detection of Jamming Attacks in Time-Critical Wireless Applications," in IEEE Transactions on Mobile Computing, vol. 13, no. 8, pp. 1746-1759, 2014.
[30] W. Xu, W. Trappe, Y. Zhang, and T. Wood, "The feasibility of launch-ing and detecting jamming attacks in wireless networks," Mobile ad hoc networking and computing (MobiHoc), 2005.
[31] C. Wang, L. Zhu, L. Gong, et al., "Accurate Sybil Attack Detection Based on Fine-Grained Physical Channel Information," Sensors, vol. 18(3), no. 878, 2018.
[32] A. A. A. Silva et al., "Predicting model for identifying the malicious activity of nodes in MANETs," Symposium on Computers and Communication (ISCC), 2015.
[33] Y. LeCun et al., "Gradient-based learning applied to document recognition," Proceedings of the IEEE, vol. 86, no. 11, pp. 2278-2324, 1998.

[34] J. S. Lee. "Digital image smoothing and the sigma filter," Computer Vision, Graphics, and Image Processing, vol. 24, no. 2, pp. 255-269, 1983.

[35] X. Wang et al., "DeepFi: Deep learning for indoor fingerprinting using channel state information," Wireless Communications and Networking Conference (WCNC), 2015.

[36] J. Machaj, P. Brida and R. Piché, "Rank based fingerprinting algorithm for indoor positioning," Indoor Positioning and Indoor Navigation (IPIN), 2011.

[37] Y. Shu et al., "Gradient-Based Fingerprinting for Indoor Localization and Tracking," in IEEE Transactions on Industrial Electronics, vol. 63, no. 4, pp. 2424-2433, 2016.

[38] F. Zhang, N. Cai, J. Wu, G. Cen, H. Wang and X. Chen, "Image de-noising method based on a deep convolution neural network," in IET Image Processing, vol. 12, no. 4, pp. 485-493, 2018.

[39] HTC U11, [Online]: https://www.htc.com/us/smartphones/htc-u11.

[40] MAC Address Clone on my TP-Link, [Online]: https://www.tp-link.com/us/support/faq/68/.

[41] M. Mohammadi, A. Al-Fuqaha, M. Guizani and J. Oh, "Semisupervised Deep Reinforcement Learning in Support of IoT and Smart City Ser-vices," Internet of Things Journal, vol. 5, no. 2, pp. 624-635, April 2018.

[42] J. A. Larcom and H. Liu, "Modeling and characterization of GPS spoof-ing," Conference on Technologies for Homeland Security (HST), 2013.

[43] C. Bonebrake and L. Ross O'Neil, "Attacks on GPS Time Reliability," in IEEE Security & Privacy, vol. 12, no. 3, pp. 82-84, May 2014.

[44] K. Jansen, M. Schafer, D. Moser, V. Lenders, C. Popper and J. Schmitt, "Crowd-GPS-Sec: Leveraging Crowdsourcing to Detect and Localize GPS Spoofing Attacks," Symposium on Security and Privacy (SP), 2018.

[45] K. Corina., and A. MacWilliams. "Overview of indoor positioning technologies for context aware AAL applications" Ambient Assisted Living, 2011.

[46] V. Spasova, and I. Iliev. "A survey on automatic fall detection in the context of ambient assisted living systems" International journal of advanced computer research vol. 4.1, pp. 94, 2014.

[47] Á.M. Guerrero-Higueras, N. DeCastro-García, F. J. Rodríguez-Lera, and V. Matellán, "Empirical analysis of cyber-attacks to an indoor real time localization system for autonomous robots," Computers & Security, vol. 70, pp. 422-435, 2017.

[48] Á. M. Guerrero-Higueras, N. Matellan, "Detection of Cyber-attacks to indoor real time localization systems for autonomous robots," Robotics and Autonomous Systems, vol. 99, pp. 75-83, 2018.

What is claimed is:

1. A method of configuring a neural network for fingerprint-based indoor localization, the method comprising:
    obtaining, by one or more processors, a first training data set comprising measurements of strength of received radio signals transmitted by radio sources for a location;
    determining, by the one or more processors, for one or more of the radio sources for the location, a statistical distribution model of measurements of strength of received radio signals transmitted by each radio source for a respective location;
    generating, by the one or more processors, a second training data set from the first training data set by extrapolating measurements of strength of the received radio signals using the determined statistical distribution model;
    adjusting, by the one or more processors, directly to the extrapolated value or indirectly using at least one of addition, subtraction, or multiplication to an intermediate value, the extrapolated measurements of strength of the received radio signals with a set of random offset values or temporally correlated offset values, wherein the set of random offset values or temporally correlated offset values is defined by a hypothetical or actual analysis of potential spoofing or potential jamming of the radio sources at the location, and wherein the set of random offset values or temporally correlated offset values is determined from a pre-defined distribution; and
    training, by the one or more processors, the neural network using the first and second training data set, wherein the trained neural network is used for fingerprint-based indoor localization of at least one of the one or more processors or another device at the location.

2. The method of claim 1, further comprising:
    prior the training step, adjusting a map or vector of the measurement of strength of the received radio signals associated with the first training data set with the set of random offset values or temporally correlated offset values.

3. The method of claim 1, wherein the pre-defined distribution for the set of random offset values is a random uniform distribution of measurement values over pre-defined range.

4. The method of claim 1, wherein the statistical distribution model include a mean parameter and a variance parameter, and wherein the values of the mean parameter and the variance parameter are used for the extrapolation.

5. The method of claim 4, wherein the statistical distribution model is based on a Gaussian distribution.

6. The method of claim 4, wherein the statistical distribution model is based on at least one of Cauchy distribution, a t distribution, a chi-square distribution, an exponential distribution, a Weibull distribution, a lognormal distribution, a gamma distribution, and a power normal distribution.

7. The method of claim 1 further comprising:
    capturing, by the one or more processors, a different set of processors, or run-time processors, the measurements of strength of the first training data set as RSSI/RSS fingerprint vectors for a number of locations; and
    converting each RSSI fingerprint vector into an image for a respective location.

8. The method of claim 7, wherein the step of converting the RSSI fingerprint vector to the image comprises:
    normalizing RSSI/RSS values of RSSI/RSS fingerprint vector to a pre-defined range of pixel intensities of the image; and
    generating the image having a number of pixels that is greater than a number of radio sources.

9. The method of claim 1, further comprising:
    obtaining a third data set comprising measurements of strength of received radio signals transmitted by the radio sources at the location;
    generating an image from the measurements of strength for the given location; and
    determining a location of the device in the given location by applying the generated image to the trained neural network.

10. The method of claim 1, wherein the radio sources are selected from the group consisting of Ultra-Wide-Band (UWB) network radio, Bluetooth network radio, ZigBee network radio, and cellular networks radios.

11. The method of claim 1, wherein the radio sources comprise a plurality of Wi-Fi network radios.

12. The method of claim 1, wherein the training step is performed on a mobile device for localization of the mobile device at the location.

13. The method of claim 1, wherein the training step is performed on a cloud or remote server, the method further comprising:
transmitting, by the one or more processors, the trained neural network to a computing device for localization of the computing device.

14. The method of claim 1, wherein the training step secures the neural network against jamming and spoofing attacks at the location.

15. The method of claim 1, wherein the neural network comprises a convolutional neural network or deep neural network.

16. A non-transitory computer readable medium comprising instructions stored thereon, wherein execution of the instructions by a processor cause the processor to:
obtain a first training data set comprising measurements of strength of received radio signals transmitted by radio sources for a location;
determine for one or more of the radio sources for the location, a statistical distribution model of measurements of strength of received radio signals transmitted by each radio source for a respective location;
generate a second training data set from the first training data set by extrapolating measurements of strength of the received radio signals using the determined statistical distribution model;
adjust, directly to the extrapolated value or indirectly using at least one of addition, subtraction, or multiplication to an intermediate value, the extrapolated measurements of strength of the received radio signals with a set of random offset values or temporally correlated offset values, wherein the set of random offset values or temporally correlated offset values is defined by hypothetical or actual analysis of potential spoofing or potential jamming of the radio sources at the location, and wherein the set of random offset values or temporally correlated offset values is determined from a pre-defined distribution; and
train the neural network using the first and second training data set, wherein the trained neural network is used for fingerprint-based indoor localization of a device at the location.

17. A system comprising:
one or more processors of a mobile device, cloud or remote server, or distributed between the two;
a memory having instructions stored thereon, wherein execution of the instructions by the one or more processors cause the one or more processors to:
obtain a first training data set comprising measurements of strength of received radio signals transmitted by radio sources for a location;
determine for one or more of the radio sources for the location, a statistical distribution model of measurements of strength of received radio signals transmitted by each radio source for a respective location;
generate a second training data set from the first training data set by extrapolating measurements of strength of the received radio signals using the determined statistical distribution model;
adjust, directly to the extrapolated value or indirectly using at least one of addition, subtraction, or multiplication to an intermediate value, the extrapolated measurements of strength of the received radio signals with a set of random offset values or temporally correlated offset values, wherein the set of random offset values or temporally correlated offset values is defined by hypothetical or actual analysis of potential spoofing or potential jamming of the radio sources at the location, and wherein the set of random offset values or temporally correlated offset values is determined from a pre-defined distribution; and
training the neural network using the first and second training data set, wherein the trained neural network is used for fingerprint-based indoor localization of a device at the location.

\* \* \* \* \*